(12) United States Patent
Liu et al.

(10) Patent No.: US 8,363,562 B2
(45) Date of Patent: *Jan. 29, 2013

(54) BANDWIDTH-ON-DEMAND SYSTEMS AND METHODS

(75) Inventors: Stephen S. Liu, Acton, MA (US); Lily F. Chen, Fort Lee, NJ (US); Nee B. Gee, Needham, MA (US); Michael F. Lane, Mashpee, MA (US); Alex E. Tserkovny, Brookline, MA (US); Vincent T. Phuah, Waltham, MA (US); Sayyid Siddiq Ali, Schwenksville, PA (US)

(73) Assignees: Verizon Services Corp., Ashburn, VA (US); Verizon Services Organization Inc., Irving, TX (US)

( * ) Notice: Subject to any disclaimer, the term of this patent is extended or adjusted under 35 U.S.C. 154(b) by 305 days.

This patent is subject to a terminal disclaimer.

(21) Appl. No.: 12/683,159

(22) Filed: Jan. 6, 2010

(65) Prior Publication Data
US 2010/0172645 A1    Jul. 8, 2010

Related U.S. Application Data

(63) Continuation of application No. 11/224,515, filed on Sep. 12, 2005, now Pat. No. 7,733,870.

(60) Provisional application No. 60/608,833, filed on Sep. 10, 2004, provisional application No. 60/635,836, filed on Dec. 14, 2004.

(51) Int. Cl.
| | |
|---|---|
| *H04L 12/26* | (2006.01) |
| *H04J 1/16* | (2006.01) |
| *G08C 15/00* | (2006.01) |
| *G06F 11/00* | (2006.01) |
| *G01R 31/08* | (2006.01) |

(52) U.S. Cl. .......... 370/252; 370/395; 370/401; 398/25; 398/45; 709/226

(58) Field of Classification Search .......... 370/252–338, 370/389–395, 401–468; 398/25–45, 67–140; 709/223–229
See application file for complete search history.

(56) References Cited

U.S. PATENT DOCUMENTS

| | | | |
|---|---|---|---|
| 6,741,572 B1 | 5/2004 | Graves et al. | |
| 6,931,011 B2 * | 8/2005 | Giacopelli et al. | 370/395.21 |
| 6,985,488 B2 * | 1/2006 | Pan et al. | 370/395.3 |
| 7,069,326 B1 * | 6/2006 | Bush | 709/226 |
| 7,209,964 B2 * | 4/2007 | Dugan et al. | 709/223 |
| 7,215,644 B2 | 5/2007 | Wu et al. | |
| 7,321,932 B1 * | 1/2008 | Monga et al. | 709/227 |
| 7,339,951 B2 * | 3/2008 | Schmidberger | 370/468 |
| 7,340,759 B1 * | 3/2008 | Rodriguez | 725/8 |
| 7,366,768 B2 * | 4/2008 | Deo et al. | 709/217 |
| 7,400,583 B2 | 7/2008 | Friskney et al. | |
| 7,437,449 B1 | 10/2008 | Monga et al. | |
| 7,492,714 B1 | 2/2009 | Liao et al. | |
| 7,570,886 B1 * | 8/2009 | Afferton et al. | 398/45 |
| 7,590,125 B2 * | 9/2009 | Lohr | 370/401 |
| 7,599,373 B1 | 10/2009 | Kalmanek, Jr. et al. | |

(Continued)

OTHER PUBLICATIONS

"Architecture for the Automatic Switched Optical Network (ASON)," ITU-T Recommendation G.8080, 2001.

(Continued)

*Primary Examiner* — Man Phan

(57) ABSTRACT

The present disclosure relates to systems and methods for providing bandwidth-on-demand telecommunications services over next-generation optical transport networks (NG-OTN). One embodiment of a system providing bandwidth-on-demand services includes a next-generation optical transport network (NG-OTN) having an intelligent control plane (ICP) and new-generation synchronous optical network (NG-SONET) capabilities. A next-generation operation support subsystem (NG-OSS) is communicatively coupled to the NG-OTN. The NG-OTN and the NG-OSS are configured to provide the bandwidth-on-demand services.

22 Claims, 17 Drawing Sheets

U.S. PATENT DOCUMENTS

| | | | |
|---|---|---|---|
| 7,733,870 | B1 | 6/2010 | Liu et al. |
| 7,778,236 | B2 * | 8/2010 | Yu ................................. 370/351 |
| 7,801,032 | B2 * | 9/2010 | Liu ................................. 370/230 |
| 7,885,186 | B2 * | 2/2011 | MacLean et al. .......... 370/230.1 |
| 2003/0137937 | A1 | 7/2003 | Tsukishima et al. |
| 2003/0206552 | A1 | 11/2003 | Lohr |
| 2004/0213221 | A1 * | 10/2004 | Civanlar et al. ............... 370/389 |
| 2005/0008014 | A1 * | 1/2005 | Mitra et al. .................... 370/392 |
| 2005/0073955 | A1 | 4/2005 | MacLean et al. |
| 2006/0002705 | A1 * | 1/2006 | Cline et al. ...................... 398/33 |
| 2007/0201366 | A1 | 8/2007 | Liu |
| 2008/0317465 | A1 | 12/2008 | Yu |

OTHER PUBLICATIONS

"Generic Framing Procedure (GFP)", ITU-T G7041/Y. 1303, International Telecommunication Union, Dec. 2001.

"ITU-T G.7042Y,1305: Link Capacity Adjustment Scheme (LCAS) for Virtual Concatenated Signals", International Telecommunication Union, Nov. 2001.

"Multi-Technology Network Management Solution Set—NML-EML Interface V.2.0", TeleManagement Forum (TMF), TMF 814, Aug. 2002.

"Itu-T G.707/Y.1322: Network Node Interface for the Synchronous Digital Hierarchy (SDH)", International Telecommunication Union, Oct. 2000.

ETSI Standards, "NGN Functional Architecture", European Telecommunications Standards Institute, Sophia-Antipo, FR, No. V 110, Dec. 2004, pp. 1-23, XP014023277.

"NGOSS Requirements Technical Specification", TeleMangement Forum (TMF), TMF 052, Jul. 2001.

Huawei Technologies Co,, "Proposal of the generic RACS functional architecture", ETSI TISPAN, No. 4td170r1, Sep. 13, 2004, pp. 1-5, XP002424685.

ITU WG3: "Revision 1 of TR-RACS, FGNGN-OD-00074" ITU-T Internal Document, International Telecommunication Union, Geneva, CH, 3 Dec. 2004, pp. 1-22, XP002424686.

"User Network Interface (UNI) 1.0 Signaling Spedfication, Release 2: Common Part", Optical Internetworking Forum, Jan. 21, 2004.

Mannie, E., "Generalized Multi-Protocol Label Switching Architecture," IETF, Internet Draft draft-ietf-ccamp-gmpls- architecture-xx.txt, 2003.

* cited by examiner

BANDWIDTH-ON-DEMAND SYSTEMS AND METHODS

RELATED APPLICATION

This application is a continuation of U.S. patent application Ser. No. 11/224,515, filed on Sep. 12, 2005, now U.S. Pat. No. 7,733,870, which claims priority under 35 U.S.C. §119(e) to both U.S. Provisional Patent Application Ser. No. 60/608,833, by Stephen Shyan-Shiang Liu et al., filed on Sep. 10, 2004, and entitled BANDWIDTH-ON-DEMAND SYSTEMS AND METHODS and U.S. Patent Application Ser. No. 60/635,836, by Stephen Shyan-Shiang Liu et al., filed on Dec. 14, 2004, and entitled SYSTEMS AND METHODS FOR POLICY-BASED INTELLIGENT PROVISIONING OF OPTICAL TRANSPORT BANDWIDTH, the contents of which are hereby incorporated by reference in their entireties.

The contents of U.S. patent application entitled SYSTEMS AND METHODS FOR POLICY-BASED INTELLIGENT PROVISIONING OF OPTICAL TRANSPORT BANDWIDTH, filed concurrently herewith in the name of Stephen Shyan-Shiang Liu et al., are hereby incorporated by reference in their entirety.

BACKGROUND INFORMATION

Optical networks are used to transmit voice, data, multimedia, and other forms of communications. As the quantity and quality of these communications have increased at significant rates, optical networks have grown. Significant numbers of client devices (e.g., routers, storage devices, content servers, etc.) have been deployed at the edges of the optical networks. As a result of these communication trends, considerable demands have been placed on traditional optical networks.

A common complaint involving services over conventional optical networks is that the services take too long to provision. It is not uncommon for clients to experience activation times on the order of weeks to months for certain high-bandwidth services (e.g., digital signal level 1 (DS1), digital signal level 3 (DS3), STS3, and so forth) because conventional provisioning techniques require many steps. For example, to create an end-to-end path, a network operator designs a path between its endpoints and configures each node on the path for all required pass-through and add-drop cross-connects. This conventional provisioning process is time-consuming, labor intensive, and error-prone. Further, as the path changes over time, redesign and reconfiguration are typically required, which will cause service disruptions.

Because conventional provisioning of bandwidth over traditional optical networks takes significant time, clients (e.g., enterprise users) often request and purchase enough bandwidth to handle the clients' peak communications needs. This translates into the clients paying for more bandwidth than is needed at non-peak times, but the lengthy time that it takes carriers to provision services over traditional optical networks has dictated this practice of paying peak bandwidth prices during non-peak times. Thus, because of the limitations of conventional provisioning techniques over traditional optical transport networks, many clients using the traditional optical transport networks end up paying for peak levels of bandwidth during off-peak times (e.g., weekends for business clients).

Emerging network technologies are providing opportunities for improving conventional optical service provisioning and management techniques. For example, emerging new-generation synchronous optical network (NG-SONET) technologies and next-generation optical transport networks with control planes are providing increased network control at the network layer. However, these emerging network technologies have not been fully realized, integrated, or implemented in the context of supporting full-service, widely flexible, on-demand bandwidth management applications.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

DETAILED DESCRIPTION OF PREFERRED EMBODIMENTS

I. Introduction

Systems and methods for providing bandwidth-on-demand telecommunications services over next-generation optical transport networks (NG-OTN) are disclosed. Architectures are provided that integrate next-generation technologies (e.g., next-generation operation support (NG-OSS) and next-generation optical transport network (NG-OTN) technologies such as new-generation synchronous optical network (NG-SONET) and intelligent control plane (ICP) capabilities). The architectures of integrated technologies provide infrastructures for supporting flexible and robust on-demand provisioning and management of on-demand bandwidth services. The on-demand bandwidth services can have wide ranges of bandwidth, typically ranging from digital signal level 1 (DS1) to synchronous transport signal levels (STS-N) and above, including wavelength.

Multiple modes are provided for initiating on-demand provisioning and managing of the on-demand bandwidth services. These modes may include, but are not limited to, end-user devices, end-user applications, and carriers' support or management interfaces. Further, modifications to active connections can be made on demand without disrupting service. Times for provisioning and tearing down connections are generally quick, and timely notifications of the statuses of connections can be provided to end users.

Further, certain integrations and interactions of technologies can be implemented to provide new classes of bandwidth services. For example, support can be provided for services that can be provisioned on-demand and/or according to a predetermined schedule. These bandwidth-on-demand services may be provided as services to users and/or implemented as part of carrier infrastructures to support on-demand provisioning in core optical networks. These and other provided features will be discussed below with reference to the drawings.

II. System Overview

Figure 1:
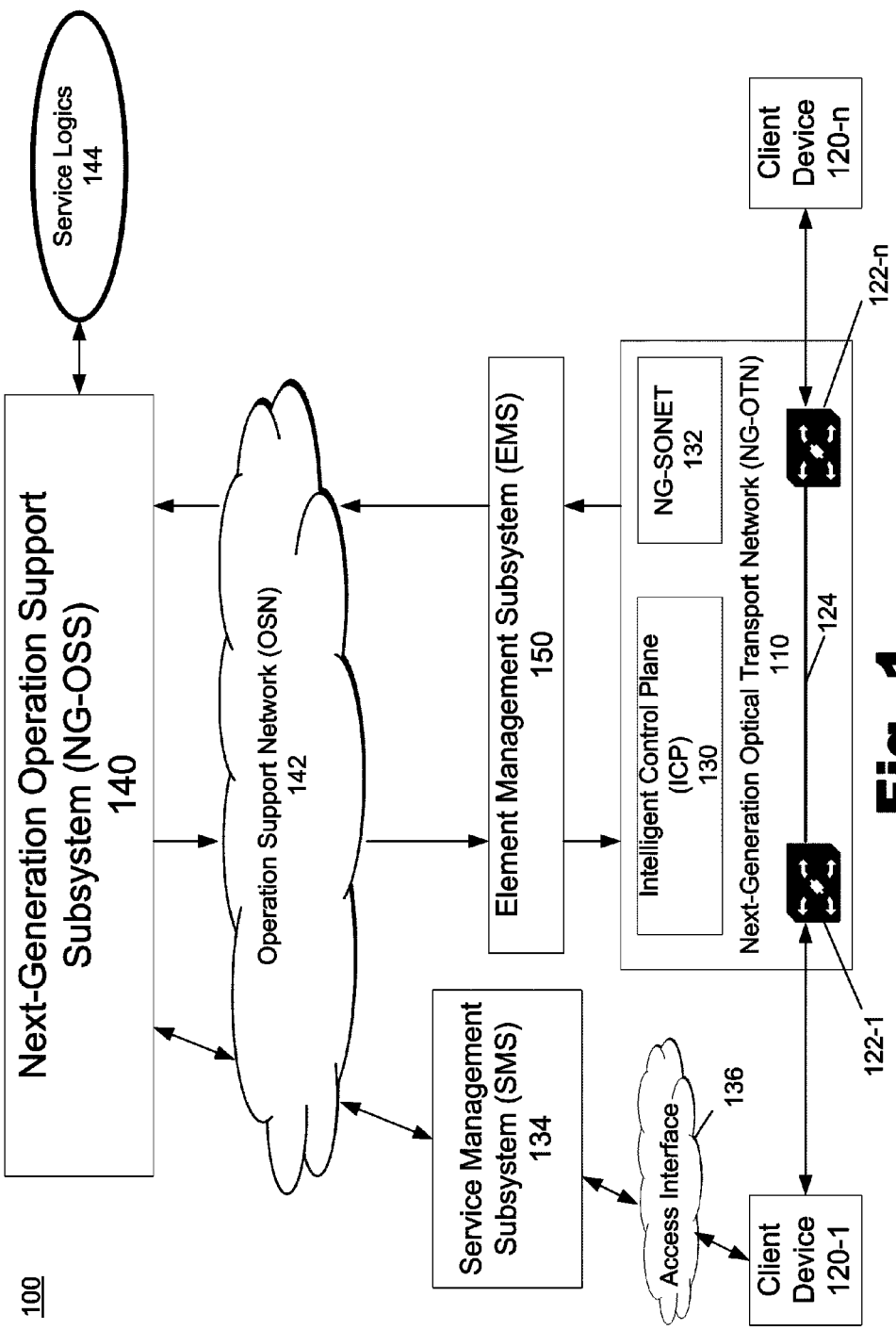
FIG. 1 is an environmental view of a particular application of a bandwidth-on-demand provisioning system in accordance with one embodiment.

FIG. 1 is an environmental view of a particular application of a bandwidth-on-demand provisioning system 100 in accordance with one embodiment. As shown in FIG. 1, a next-generation optical transport network (NG-OTN) 110 is positioned to communicatively couple client devices 120-1 and 120-n (collectively the "client devices 120") with one another via network elements (NE) 122-1 through 122-n (collectively the "network elements 122") and transmission mediums 124 forming a communication path between the client devices 120. The NG-OTN 110 includes an intelligent control plane 130 and new-generation synchronous network (NG-SONET) 132 technologies. The system 100 further includes a service Management subsystem (SMS) 134 communicatively coupled to the client device 120-1 via an access interface 136. The SMS 134 is connected with a next-generation operation support subsystem (NG-OSS) 140 via an operation support network (OSN) 142. The NG-OSS 140 can access and process service logics 144. The NG-OSS 140 may be communicatively coupled to the NG-OTN 110 via the OSN 142 and an element management subsystem (EMS) 150.

Components of the system 100 may include any computer hardware and/or instructions (e.g., firmware and software programs), or combinations of instructions and hardware, helpful for the performance of any of the bandwidth-on-demand management processes supported by the architecture and processing of the system 100. Accordingly, those skilled in the art will recognize that the various processes described herein may be implemented at least in part as instructions executable by one or more computing devices. In general, one or more processors (e.g., microprocessors) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) may include any medium that participates in providing data (e.g., instructions) that may be read by a computer (e.g., by a processor of a computer), including any computer-readable medium known to those of ordinary skill in the art. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Figure 2:
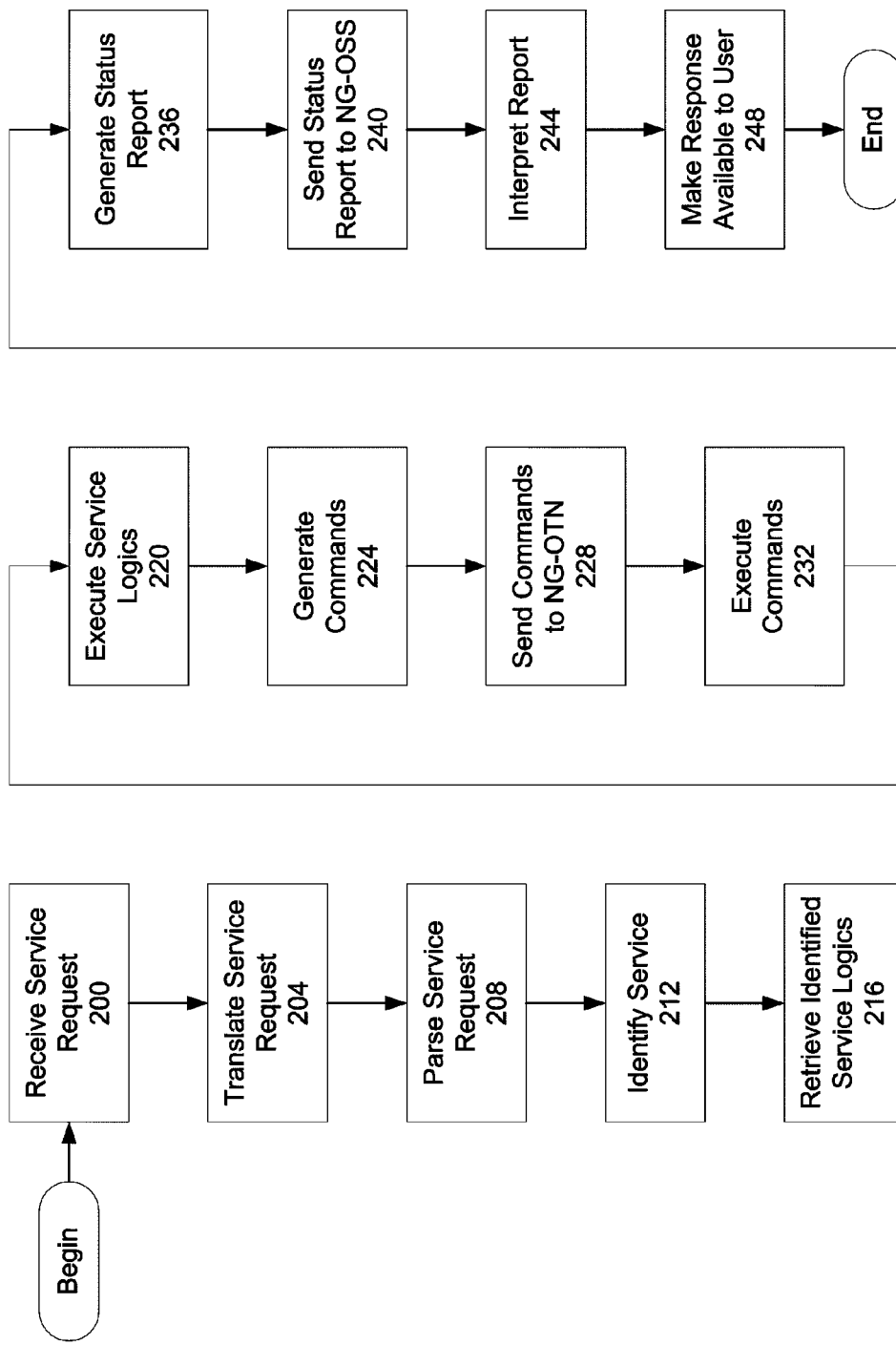
FIG. 2 is a flowchart of an example of a method for on-demand provisioning of services with the system of FIG. 1, according to an exemplary embodiment.

The system 100 provides users of the client devices 120 with functionalities for managing telecommunications services on-demand. FIG. 2 is a flowchart of an example of a method for managing (e.g., provisioning) bandwidth services on-demand with the system 100 of FIG. 1. It is anticipated that the method shown in FIG. 2 can be practiced with additional steps, without some of the illustrated steps, or in a different order than that shown. At step 200, the system 100 receives a service request from any particular client device 120. The service management subsystem (SMS) 134 is configured to receive the service request from the client device 120 via the access interface 136.

At step 204, the SMS 134 translates and sends the service request to the NG-OSS 140 via the operation support network (OSN) 142. At step 208, the NG-OSS 140 parses the service request into a service database. At step 212, a service type is identified from the service request. At step 216, the NG-OSS 140 retrieves associated service logics 144. At step 220, the NG-OSS 140 executes the retrieved service logics 144, including generating commands from the service logics 144 at step 224. At step 228, the NG-OSS 140 sends the commands to the NG-OTN 110.

At step 232, the NG-OTN 110 executes the commands to perform or implement the requested service. For example, if the requested service is the provisioning of services, the NG-OTN 110 can execute provisioning commands to provision the service. At step 236, the EMS 150 generates a status report. At step 240, the EMS 150 sends the status report to the NG-OSS 140 via the operation support network (OSN) 142. The NG-OSS 140 interprets the status report at step 244 and makes a response available to the client device 120 through the SMS 134 at step 248.

The system 100 of FIG. 1 and the method of FIG. 2 provide structure and functionality for provisioning and managing bandwidth services on-demand. The elements shown in FIG. 1 and the functionalities listed in FIG. 2 will now be described in more detail.

A. Client Device

Client devices 120 can include any device or devices that requests or monitors services provided by a carrier. The client device 120 can include any devices or logic helpful for submitting service requests to the system 100, monitoring service attributes, and/or connecting with other client devices 120 via the NG-OTN 110. For example, the client device 120 can include but is not limited to computing devices, interfaces, dial-up connections, telephones, modems, servers, routers, switches, network components, application programs and servers, applications program interfaces (API's), etc.

Client devices 120 can include devices for connecting to network elements 122 of the NG-OTN 110 to utilize communications paths over the NG-OTN 110. For example, client devices 120 can include Ethernet devices, networks (e.g., local area networks), storage area network (SAN) equipment, computers, switches, ports, routers, network components, etc. capable of linking to communication paths of the NG-OTN 110. Through the client devices 120, users of the client devices 120 can communicate with other entities or persons via communication paths over the NG-OTN 110. Client devices 120 may be used by any entity, person, or organization, including customers (e.g., enterprise customers) or clients of service providers.

The client device 120 may submit a service request to the system 100 through the access interface 136. The service request can be submitted by web form or any other electronic format. The client device 120 can include an application program capable of generating and transmitting service requests to the system 100.

B. Access Interface

The access interface 136 can include any communicative connection(s) between the SMS 134 and the client device 120, including interfaces known to those skilled in the art. The access interface 136 may include any communicative network or electronic data interchange, including but not limited to a public network, an IP network (e.g., the Internet), a public-switched telephone network, a proprietary network, and/or a private network.

C. Service Management Subsystem (SMS)

The service management subsystem (SMS) 134 provides a system 100 interface with client devices 120. Through the SMS 134, the system 100 can provide functionality enabling customers to use the client devices 120 to submit service requests, submit changes to service requests after initial submission, receive timely order-processing status reports, monitor progress of order-processing, monitor resource usages and billing-related statistics of an active service, monitor service performance offered by service providers, and receive reports about services in preferred formats (e.g., electronic copy, email, hard copy, etc.).

Service requests can include requests for a variety of system 100 actions, including but not limited to setup, modification, and tear-down of bandwidth services. Service requests can request any other service provisioning or management function provided by the system 100.

Figure 3:
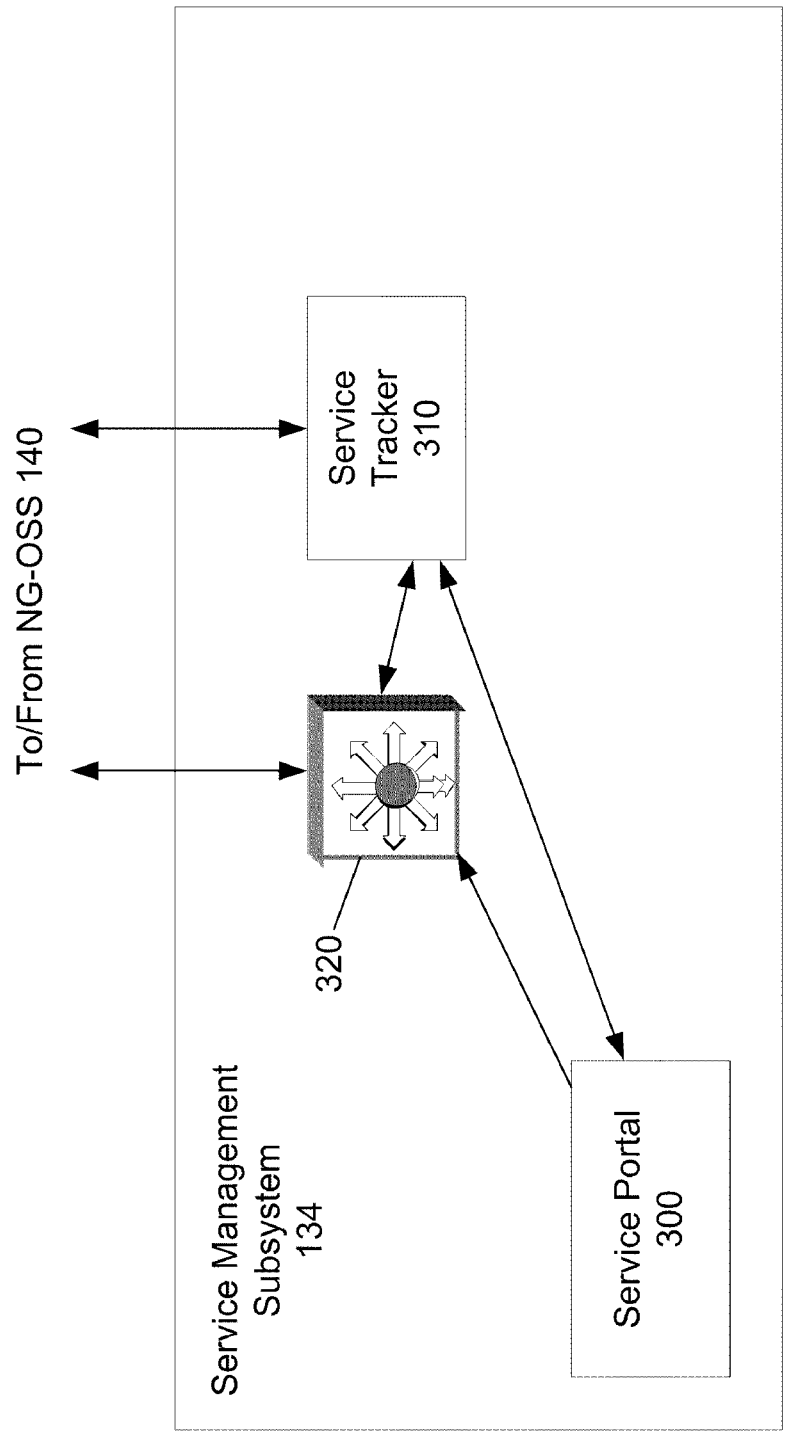
FIG. 3 is a block diagram of the service management subsystem (SMS) of FIG. 1, according to an exemplary embodiment.

FIG. 3 is a block diagram of the service management subsystem (SMS) 134 of FIG. 1. The SMS 134 may include a service portal 300, a service tracker 310, an order-intake server 320, and any other device, logic, and/or interface helpful for processing interactions between client devices 120 and the NG-OSS 140.

The service portal 300 can be configured to communicate with the client device 120 through the access interface 136. In particular, the service portal 300 is configured to receive service requests, status queries, and related information from the client device 120. The service portal 300 may also be configured to provide the client device 120 with status reports and responses to the service requests and status queries.

The service portal 300 can include but is not limited to a web portal, a voice portal, a graphical user interface (GUI), an electronic data interchange (EDI), any portal known to those skilled in the art; and any other interfaces, devices, and/or logic helpful for communicating with the client device 120. Accordingly, the service portal 300 can be configured to provide the client device 120 with capabilities for submitting service requests, receiving status reports, and monitoring services. In one embodiment, the service portal 300 includes a web portal. The portal may utilize extensible mark-up language (XML) as its modeling language. In another embodiment, the service portal 300 includes a voice portal utilizing voice recognition technologies.

The SMS 134 is preferably configured to translate received service requests into a form that can be used by the NG-OSS 140. The service portal 300, the order-intake server 320, or a combination of devices, can be configured to translate the service requests into another language before sending the service requests to the NG-OSS 140. In one embodiment, the SMS 134 translates service requests into extensible mark-up language (XML) using an XML schema based on service features. Information sent from the NG-OSS 140 to the client device 120 can be translated in similar fashion.

The order-intake server 320 is configured to perform a number of functions to coordinate system 100 processing and communications with the client device 120. The order-intake server 320 processes service requests that have been received via the service portal 300. In particular, the order-intake server 320 may validate a service request to ensure that it satisfies predefined rules defining a valid service request. In one embodiment, the order-intake server 320 verifies that service requests each include certain predefined parameters. The predefined parameters can include but are not limited to any number and combination of connection types, origin and destination points, origin point site and port identifications, destination point site and port identifications, path identifications, session identifications, bandwidth requirements (e.g., maximum bandwidth, minimum bandwidth, bandwidth settings, or changes to current bandwidth), service schedules (e.g., a schedule table), periods to be modified, protection class, restoration settings, request identifier (e.g., path setup, modification, or teardown), selected service, service type, and service classes. The order-intake server 320 then sends valid service requests to the NG-OSS 140 for further processing.

The service tracker 310 tracks the statuses of services and service requests. The service tracker 310 obtains tracking information from the NG-OSS 140 via a bi-directional communication interface (e.g., the OSN 142) between the SMS 134 and the NG-OSS 140. Because the state of services is tracked at the SMS 134, the system 100 is able to provide client devices 120 with timely service and service request status information. The tracked state of the services allows customers to monitor attributes and statuses associated with the services.

The service tracker 310 may also be configured to prepare information, e.g., status reports, to be sent to the service portal 300 for access by the client device 120. With the reports, the system 100 is able to provide the client device 120 with indications of success or failure of a service request, as well as reasons as to why a requested action failed. For example, status reports can include but are not limited to indications of setup success or failure, modification success or failure, tear-down success or failure, error, unknown service session or path, and a transition to a new scheduled period. To aid the preparation of status reports, the service tracker 310 may receive or access information from the NG-OSS 140 and prepare the information for transmittal to the client device 120 via the service portal 300.

While the service portal 300, the order intake server 320, and the service tracker 310 are shown as separate entities in FIG. 3, those skilled in the art will understand that different configurations can be implemented to obtain the same or similar features of the portal 300, server 320, and service tracker 310. For example, these entities can be combined into a single entity capable of performing the same functionalities.

D. Operation Support Network (OSN)

To enable timely tracking of service statuses, the system 100 should include a reliable communication channel between the SMS 134 and the NG-OSS 140. As shown in FIG. 1, the system 100 may include the operation support network (OSN) 142, which functions as a communication link between various system elements. In particular, the OSN 142 provides a reliable and robust bi-directional communications interface between the SMS 134 and the NG-OSS 140. The OSN 142 enables the SMS 134 to receive and maintain status information for services as discussed above.

The OSN 142 can include any communications interface that enables the SMS 134 to track the statuses of services and service requests. In one embodiment, the OSN 142 includes a private network. However, other known networks may be used to establish adequate communications links between the various system 100 elements, namely the SMS 134 and the NG-OSS 140.

The OSN 142 allows elements of the system 100 to be connected independently of the location of the elements. In one embodiment, the OSN 142 connects system 100 elements that are distributed over a service carrier's footprint. This provides the system 100 with scalability. In particular, multiple SMSs 134 may be distributed strategically over the footprint of the service carrier to leverage market penetrations.

The OSN 142 can provide a communications interface between the NG-OSS 140 and the NG-OTN 110. As shown in FIG. 1, communications between the NO-OSS 140 and the NG-OTN 110 may go through the OSN 142 and the EMS 150. Alternatively, the EMS 150 may be omitted for certain communication protocols (e.g., Transaction Language 1 (TL1) protocol). The OSN 142 can include any communications interface capable of communicatively connecting the NG-OSS 140 and the NG-OTN 110, either directly or through intermediary interfaces (e.g., EMSs 150 or other network management subsystems (NMS).

E. Next-Generation Operation Support Subsystem (NG-OSS)

The NG-OSS 140 comprises a new generation of operation support systems (OSS) having functionalities designed to leverage and manage the capabilities and intelligence of the NG-OTN 110, which will be discussed below. The NG-OSS 140 includes the capabilities of conventional OSSs as well as additional features. In particular, the NG-OSS 140 can be configured with functionalities for configuring and managing networks (e.g., NG-OTN 110) that perform auto-discovery and self-inventory, path calculations subject to traffic engineering constraints, dynamic path setup and tear-down initiated by either carrier or client devices 120, dynamic bandwidth modifications on existing services, and a variety of service protection and restoration schemes offered by the intelligent control plane 130 of the NG-OTN 110.

Even more specifically, the NG-OSS 140 is preferably configured to manage the intelligent control plane 130 functions and NG-SONET 132 capabilities of the NG-OTN 110 described below. The NG-OSS 140 is able to provide end-to-end path functions including fault, configuration, accounting, performance, and security (FCAPS functions). The NG-OSS 140 may be configured to perform myriad other functions, including any of the functions described in either "NGOSS Requirements Technical Specification," TeleManagement Forum (TMF), TMF 052, July 2001 or "Multi-Technology Network Management Solution Set—NML-EML Interface V.2.0," TeleManagement Forum (TMF), TMF 814, July 2001, both of which are hereby incorporated by reference in their entirety.

The NG-OSS 140 is configured to interface with the NG-OTN 110. A variety of interfaces may be employed to connect the NG-OSS 140 with the NG-OTN 110, including but not limited to the operation support network (OSN) 142, the element management subsystem (EMS) 150, a network management subsystem (NMS), and any standards-based interfaces for connecting with the NG-OTN 110. In one embodiment, the interface between the NG-OTN 110 and the NG-OSS 140 supports a TMF-814 standards interface to the EMS 150, which communicates with the NG-OTN 110. In another embodiment, the interface comprises a Transaction Language 1 (TL1) interface to the network elements (NE) 122. With a TL1 interface in place, the system 100 may operate without the EMS 150. It is anticipated that other interfaces employing different standards or protocols (e.g., revised TMF-814, Common Object Request Broker Architecture (CORBA), extensible mark-up language (XML), or Simple Network Management Protocol (SNMP)) can be implemented in the system 100 to operably connect the NG-OSS 140 with the NG-OTN 110.

Figure 4A:
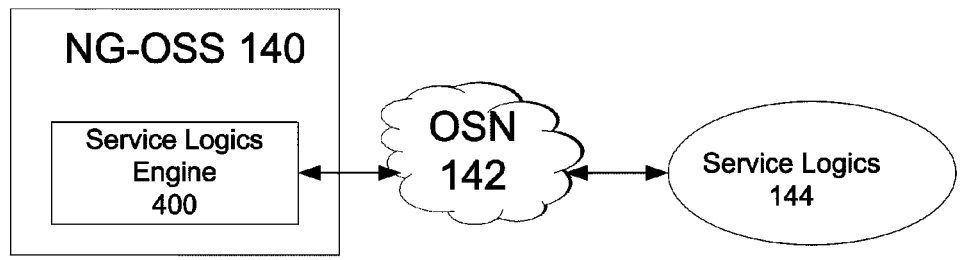
FIG. 4A is a block diagram of the next-generation operation support subsystem (NG-OSS) and service logics of FIG. 1, according to an exemplary embodiment.

The NG-OSS 140 is configured to implement and utilize service logics 144 to create commands for controlling the NG-OTN 110. FIG. 4A is a block diagram illustrating the relationship between the NG-OSS 140 and the service logics 144 according to FIG. 1. In this configuration, the NG-OSS 140 includes a service logics engine 400 configured to communicate with the service logics 144 via the operation support network (OSN) 142.

Figure 4B:
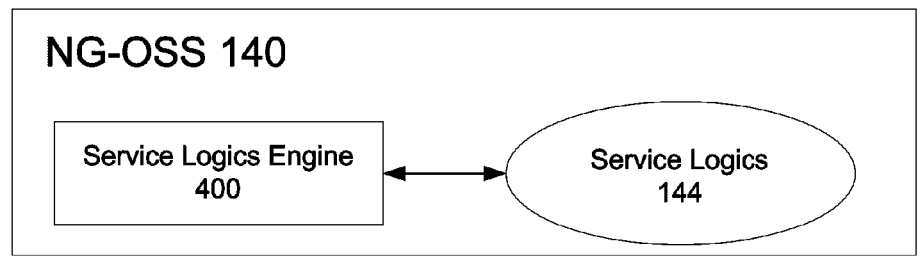
FIG. 4B is a block diagram of the next-generation operation support subsystem (NG-OSS) according to another embodiment.
Figure 4C:
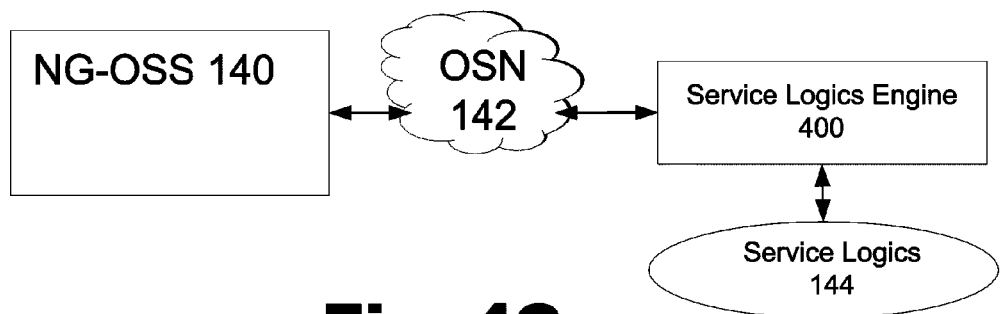
FIG. 4C is a block diagram of the next-generation operation support subsystem (NG-OSS), the service logics, and service logics engine according to yet another embodiment.

The NG-OSS 140 can use other configurations to access the service logics 144. FIG. 4B Illustrates a configuration in which the service logics 144 and service logics engine 400 are integrated within the NG-OSS 140. FIG. 4C shows another configuration in which the service logics 144 and the service logics engine 400 communicate with the NG-OSS 140 via the OSN 142. Other network and/or interface configurations can be used in place of or in addition to the OSN 142. Thus, the service logics 144 can be built into the NG-OSS 140 or implemented on a separate platform in communication with the NG-OSS 140.

The service logics 144 define services provided by the system 100. In particular, the service logics 144 define procedures for managing bandwidth-on-demand services at the NG-OTN 110 level. The service logics 144 can be implemented as computer processes (e.g., software processes) or other procedures stored in computer-readable mediums that are able to be processed by computing platforms. Different service logics 144 can define different on-demand services. Two examples of bandwidth-on-demand services and their respective service logics 144 will be discussed further below.

The service logics engine 400 should be configured to manage and execute the service logics 144. In particular, the service logics engine 400 can be configured to provide for entry, removal, modification, and execution of service logics 144. This provides the user and the carrier with functionalities for configuring different service logics 144 to define desired on-demand services or classes of on-demand services.

The service logics 144, when executed, generate commands capable of being executed by the NG-OTN 110 to process or implement service requests. For example, for a particular service request submitted by the client device 120, the NG-OSS 140 uses parameters from the service request to identify and access an associated service logic 144. The parameters from the service request are fed into the accessed service logic 144, and the service logic engine 400 executes the accessed service logic 144 with the inserted parameters to generate a sequence of commands, which are transmitted to the NG-OTN 110 for execution.

In one embodiment, the commands generated by execution of the service logics 144 comprise Transaction Language 1 (TL1) protocol commands, which are executable by components and processes of the NG-OTN 110. TL1 protocol commands are known to those skilled in the art. For example, "LambdaUnite MSS—Operations System Engineering Guide", provided by Lucent Technologies of Murray Hill, N.J., which is hereby incorporated by reference in its entirety, discloses TL1 protocol commands useful for controlling and instructing the NG-OTN 110. Example TL1 commands include edit/change ("ED_x"), enter ("ENT_x"), retrieve ("RTRV_x"), and delete ("DLT_x"). The service logics engine 400 may be configured to execute the service logics 144 with parameters from a relevant service request to generate TL1 commands that can be executed by the NG-OTN 110 to satisfy the service request.

The commands generated from the service logics 144 can be transmitted to the NG-OTN 110 in any of the ways discussed above, including to any particular network element (NE) 122, through the OSN 142 in accordance with TL1 format, or to the element management subsystem (EMS) 150 through the OSN 142 in TMF-814 format. Upon receiving the sequence of commands, the NG-OTN 110 is able to execute the sequence of commands to attempt to carry out the service request. The NG-OTN 110 may provide status updates of command execution to the NG-OSS 140.

The service logics 144 can be configured to interpret TL1 protocol messages that are received by the NG-OSS 140 from the NG-OTN 110 (e.g., via the OSN 142) during the service logics 144 execution. The NG-OSS 140 maintains the call state for every service request, and is configured to interpret TL1 messages that are received from the NG-OTN 110. The NG-OSS 140 correlates the received TL1 messages with call states and translates the TL1 messages into a format that can be provided either directly to the client device 120 or to the client device 120 via the SMS 134. The TL1 messages can be any TL1 messages known in the art, including but not limited to, TL1 responses to execution of the TL1 commands, TL1 alarms, and TL1 status notifications. The status reports generated based on the TL1 messages may include any of the responses discussed above.

F. Next-Generation Optical Transport Network (NG-OTN)

The NG-OTN 110 can comprise a transport/data plane that includes network elements (NE) 122 helpful for provisioning and activating communications paths between client devices 120. Preferably, the network elements 122 comprise next-generation network elements. For example, the NG-OTN 110 can include, but is not limited to, multi-service provisioning protocol (MSPP), next-generation add and drop multiplexer (NG-ADM), reconfigurable optical add/drop multiplexer (ROADM), optical cross-connect (OXC), wavelength cross-connect (WXC), coarse wavelength division multiplexing (CWDM), and dense wavelength division multiplexing (DWDM) platforms that are equipped to support functions of the intelligent control plane (ICP) 130.

Network elements 122, including MSPP, OXC, and NG-ADM platforms can be equipped with NG-SONET capabilities. These network elements 122 can support bandwidth-on-demand services. Other network elements 122, including ROADM, WXC, DWDM, and CWDM platforms, can support wavelength-on-demand services.

In one embodiment, the NG-OTN 110 includes a conventional SONET synchronized digital hierarchy (SONET/SDH) transport network modified with additional functionality. The NG-OTN 110 includes the ICP 130 and/or the NG-SONET 132, which help provide the additional functionalities. The ICP 130 can be implemented over any of the network element 122 platforms listed above.

The ICP 130 can be configured to enable the NG-OTN 110 to operate in a self-running and/or fully automated mode. The ICP 130 is able to provide functions for automatically discovering and self-inventorying network topology, resources, and connection maps. The ICP 130 can also be configured to perform dynamic end-to-end path calculations subject to engineering constraints, as well as dynamic end-to-end path setup and teardown in a single step and/or single-ended fashion. The ICP 130 may support a variety of protection and restoration schemes.

The functions of the ICP 130 technology have been implemented using several different modified optical transport network platforms, such as Lucent Technologies' Lambda Unite and next-generation network elements. As will be appreciated by those skilled in the art, the ICP 130 functions and technologies can be implemented using known industry standards that have been defined, are currently being defined, and will be defined in the future. With the functions described above, the ICP 130 can provide improved network efficiency, enhanced network resiliency, and new revenue opportunities.

As known to those skilled in the art, the ICP 130 can be configured to operate on several interface platforms, including but not limited to internal node-to-node interfaces (I-NNI), external network-to-network interfaces (E-NNI), and user network interfaces (UNI). As known to those skilled in the art, the ICP 130 is able to provision pre-deployed resources such as bandwidth in the NG-OTN 110.

NG-SONET 132 can provide features of conventional SONET technologies, as well as additional features. NG-SONET 132 is able to enhance conventional SONET with any of the following features: service adaptation via generic framing protocol (GFP); virtual concatenation (VCAT), split routing (SR); and link capacity adjustment scheme (LCAS). GFP provides standardized mapping mechanisms to adapt higher-layer (e.g., Layer 2 and above) client signals for transport over NG-SONET 132 or NG-OTN 110. VCAT provides for maximization of bandwidth utilization by flexible channel sizing over a NG-SONET 132 network via inverse multiplexing of SONET payload into multiple component signal components. For example, with VCAT, NG-SONET 132 provides for inverse multiplexing of the SONET payloads into multiple components of level-1 synchronous transport signals (STS-1) for high-order VCAT or into multiple components of VT1.5 signals for low-order VCAT. Alternatively, other signal protocols may be used for multiple components of the VCAT function. Split routing (SR) allows the VCAT component paths to be routed disjointedly to achieve a high degree of route diversity to meet service availability requirements. LCAS provides a mechanism for dynamically adjusting the bandwidth of any VCAT path by adding or removing component paths in VCAT groups. With these functions, the system 100 can provide enhanced network capabilities, including the ability to modify bandwidth of an active service without any service disruption.

The features discussed above are implemented at end points of conventional SONET connections. Therefore, NG-SONET technologies can be implemented over existing SONET core networks, thereby allowing service providers to leverage existing SONET infrastructures. Known standards, such as those disclosed in ITU-T Recommendations G.707, G.7041, and G.7042, which are hereby incorporated by reference in their entirety, can be used to implement NG-SONET capabilities over existing SONET/SDH infrastructures. Products of various OTN vendors implementing these NG-SONET standards may be used in the system 100. The NG-SONET capabilities can include any feature known to those skilled in the art.

Figure 5:
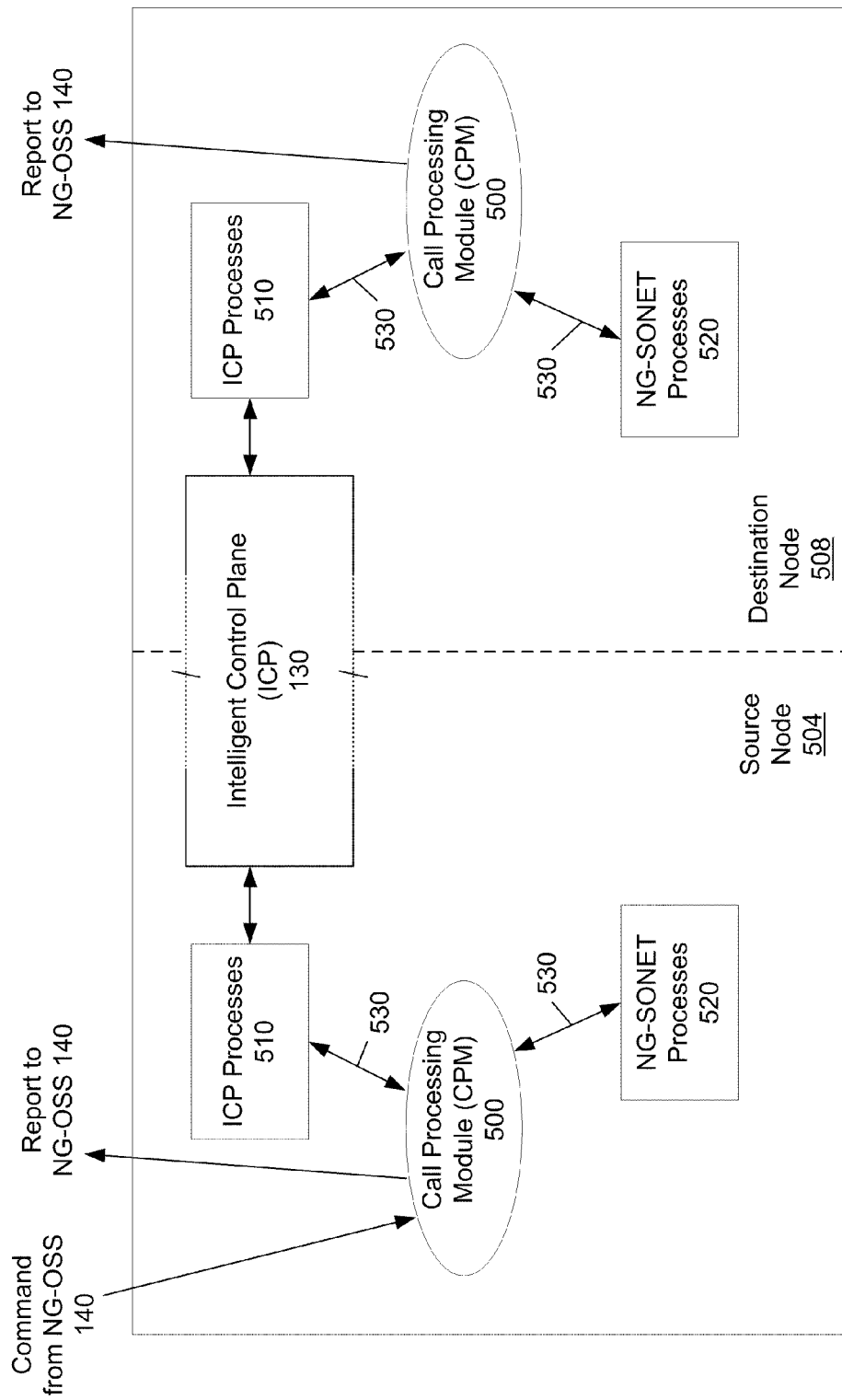
FIG. 5 is a block diagram of the next-generation optical transport network (NG-OTN) of FIG. 1, according to an exemplary embodiment.

The ICP 130 and NG-SONET 132 features are integrated to work together at the end nodes that provide ingress or egress points for SONET (e.g., SONET/SDH) network paths. FIG. 5 shows the NG-OTN 110 having call-processing modules (CPM) 500. The CPMs 500 are located at the end nodes (source node 504 and destination node 508) and are configured to integrate the ICP 130 and NG-SONET 132 functions. Each CPM 500 is connected with ICP processes 510 and NG-SONET processes 520 by links 530. Preferably, the links 530 comprise real-time interfaces. The ICP processes 510 include routing and signaling processes of the ICP 130. The NG-SONET processes 520 include the VCAT, LCAS, and SR functions of the NG-SONET 132 as described above.

The CPM 500 is configured to execute processes (e.g., software processes) that coordinate the provisioning and management of on-demand services. The CPM 500 communicates with the NG-OSS 140, the ICP processes 510, and the NG-SONET processes 520 to perform this coordination. As shown in FIG. 5, the CPM 500 at a source node 504 identified in a service command may receive commands from the NG-OSS 140 and/or send reports to the NG-OSS 140. For example, the CPM 500 may receive a path-setup command and notify the NG-OSS 140 whether the path-setup command was successfully completed.

When the CPM 500 at the source node 504 receives service commands (e.g., a sequence of path-setup or management commands), it directs the execution of the commands by various network and hardware components of the NG-OTN 110 to establish the requested path. In one embodiment, the service commands received from the NG-OSS 140 are in TL1 protocol. The CPM 500 coordinates with the ICP processes 510 and the NG-SONET processes 520 to facilitate the execution of the commands at the source node 504. The ICP 130 processes the commands to establish a path up to the destination node 508, where ICP processes 510 at the destination node 508 receive the path command from the ICP 130 and setup the last leg of the path to the destination node 508. The CPM 500 at the destination node 508 coordinates the completion of the path setup. If NG-SONET technologies are requested, the CPM 500 coordinates with the NG-SONET processes 520 to invoke the requested NG-SONET technology. The CPM 500 may be configured to send reports and other data to the NG-OSS 140 to indicate whether the requested path was successfully provisioned or managed (e.g., setup or torn down). This process is described in more detail with reference to FIGS. 6A-6D.

Figure 6A:
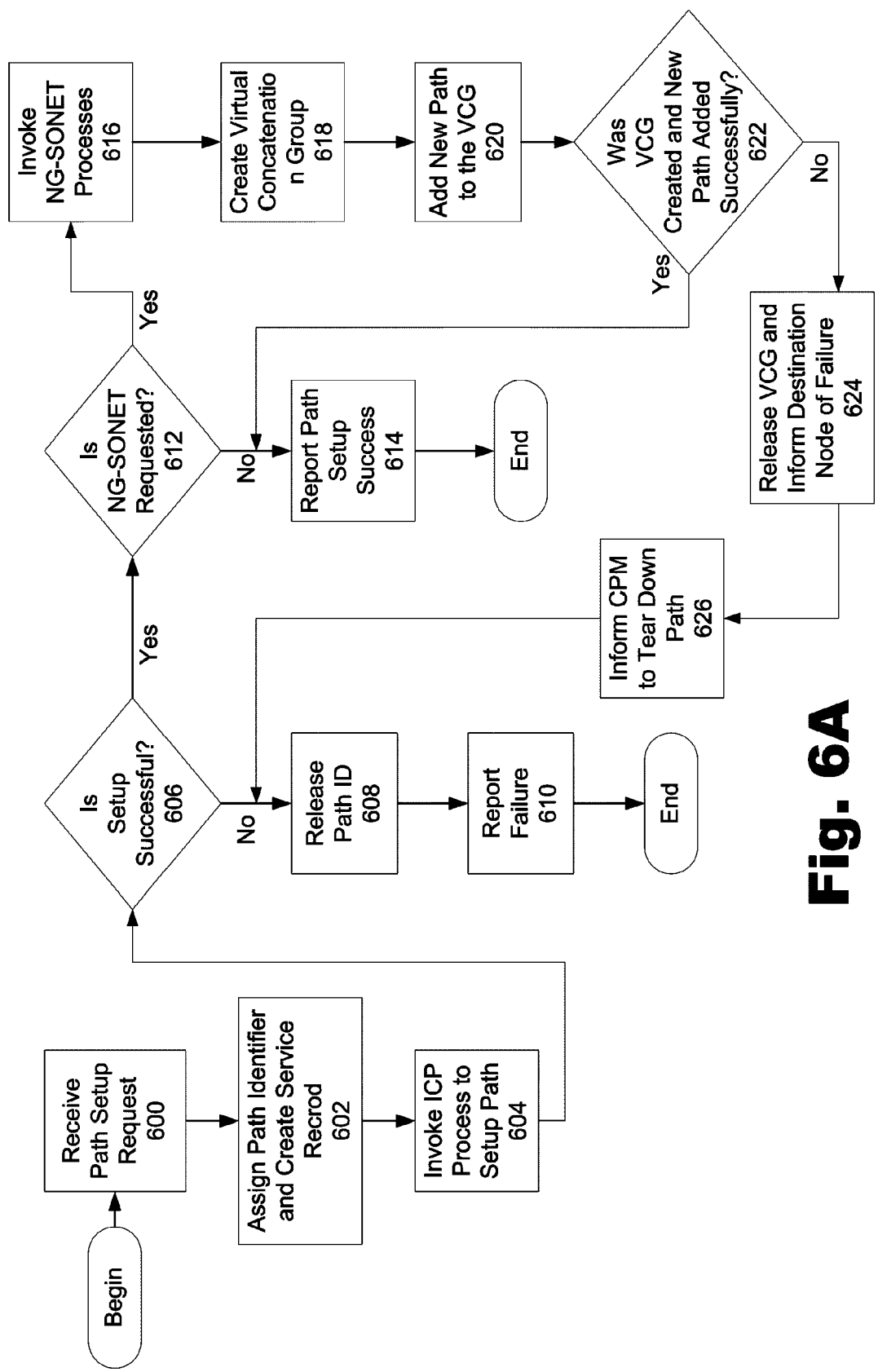
FIG. 6A is a flowchart illustrating an example of a method of path setup at a source node of the next-generation optical transport network (NG-OTN) of FIG. 5, according to an exemplary embodiment.

FIG. 6A is a flowchart illustrating an example of a method of path setup at a source node 504 of the NG-OTN 110 of FIG. 5. At step 600, the CPM 500 at the source node 504 receives a command from the NG-OSS 140 indicating a path setup request. The path command should include parameters specifying origin and destination points, bandwidth requirements, service class, action identifier, and whether NG-SONET functions are desired for the path command. Any other information helpful for provisioning the path may also be included with the path command.

At step 602, the CPM 500 assigns a path identifier and creates a service record for the service request. At step 604, the CPM 500 invokes the ICP processes 510 to initiate path setup via ICP 130 signaling. At step 606, the CPM 500 coordinates with the ICP processes 510 to determine whether path setup was successful. If it is determined that path setup was unsuccessful, processing continues at step 608, at which step the CPM 500 releases the path identification. At step 610, the CPM 500 reports the failed path setup to the NG-OSS 140. The failure report may include a cause code or other indication of a reason for failure.

On the other hand, if it is determined at step 606 that the path setup was successful, processing continues at step 612, at which step the CPM 500 determines whether NG-SONET functions are requested for the path setup. In one embodiment, this determination is made by checking parameter(s) submitted with the path command.

If it is determined at step 612 that NG-SONET is not requested, processing continues at step 614. At step 614, the CPM 500 reports to the NG-OSS 140 that the path was setup successfully.

On the other hand, if it is determined at step 612 that NG-SONET is requested, processing continues at step 616, at which step the CPM 500 invokes the NG-SONET processes 520 to perform VCAT and/or LCAS signaling. At step 618, the NG-SONET processes 520 create a virtual concatenation group (VCG). At step 620, a new path is added to the VCG. At step 622, it is determined whether the VCG was created and the new path was added successfully. If it is determined at step 622 that the VCG was not created successfully, processing moves to step 624. At step 624, the VCG is released and the destination node is informed of the failure. At step 626, the CPM 500 is notified to tear down the path. The CPM 500 releases the path identification at step 608 and reports the failed path setup to the NG-OSS 140 at step 610.

On the other hand, if it is determined at step 622 that the VCGs were created successfully, processing move to step 614, at which step the CPM 500 reports a successful path setup to the NG-OSS 140 as discussed above. Similar methods to that shown in FIG. 6A can provide for processing other types of service requests, e.g., modification and/or teardown of an active connection.

Figure 6B:
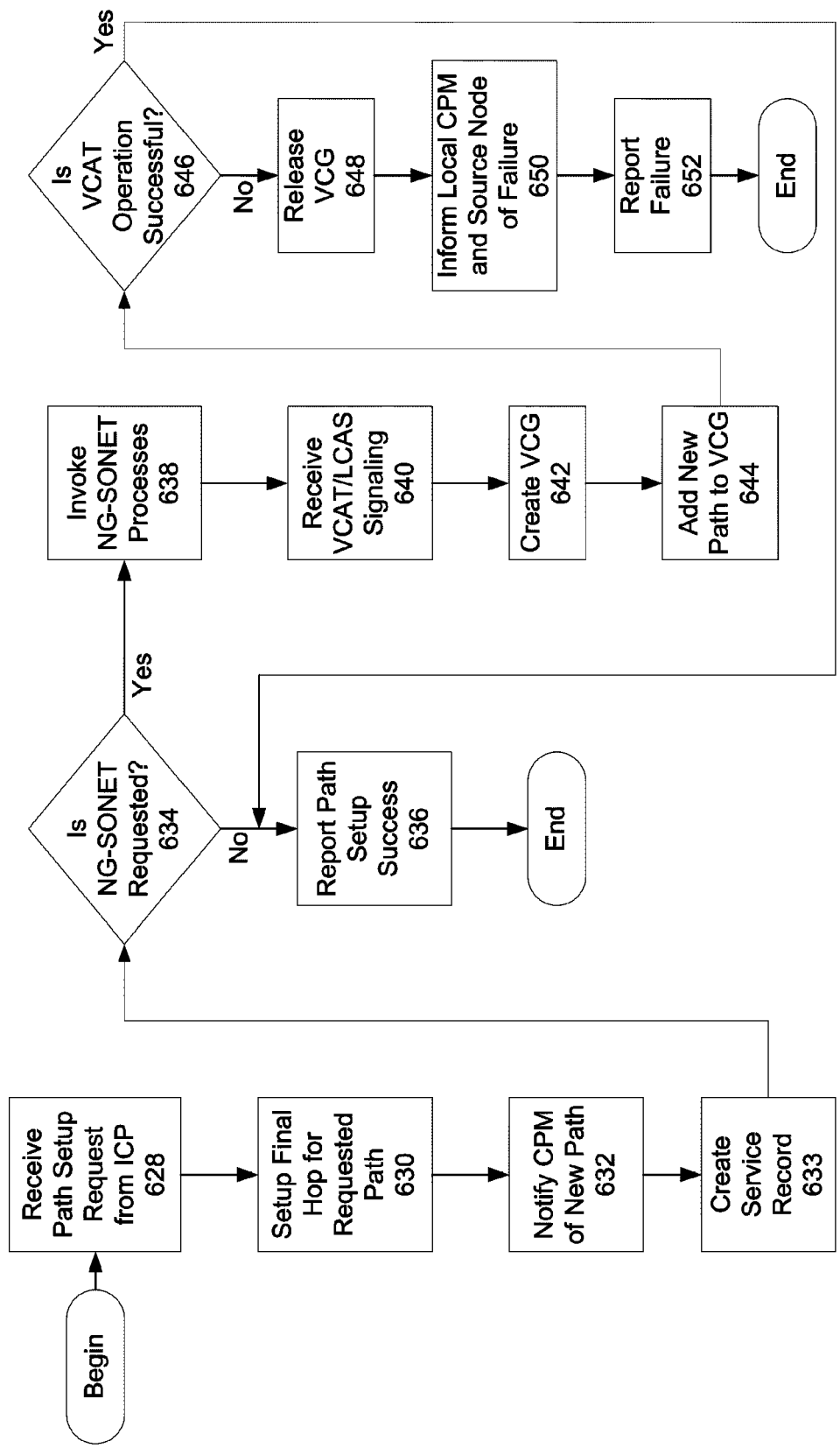
FIG. 6B is a flowchart illustrating an example of a method of path setup at an end node of the next-generation optical transport network (NG-OTN) of FIG. 5, according to an exemplary embodiment.

FIG. 6B is a flowchart illustrating an example of a method of path setup at a destination node 508 of the NG-OTN 110 of FIG. 5. At step 628, the ICP processes 510 at the end node receive a command from the ICP 130 indicating a path setup command. At step 630, the ICP processes 510 establish a final link for the requested path, thereby completing the path from the source node 504 to the destination node 508. At step 632, the ICP processes 510 notify the CPM 500 at the destination node 508 of the new path and the new path's attributes. At step 633, the CPM 500 at the destination node 508 creates a service record for the service request. At step 634, the CPM 500 at the destination node 508 determines whether an NG-SONET function was requested. If it is determined that NG-SONET functionality was not requested, processing continues at step 636, at which step, the CPM 500 reports to the NG-OSS 140 that the path was setup successfully.

On the other hand, if it is determined at step 634 that NG-SONET functionality was requested in the path management request, processing continues at step 638, at which step the CPM 500 invokes the NG-SONET processes 520 to wait for VCAT and/or LCAS signaling from the source node 504. At step 640, the NG-SONET processes 520 at the destination node 508 receive the VCAT and/or LCAS signaling from the source node 504. At step 642, the NG-SONET processes 520 create a virtual concatenation group (VCG). At step 644, a new path is added to the VCG.

At step 646, it is determined whether the VCAT operation was successful. If it is determined that the VCAT operation was not successful, processing moves to step 648. At step 648, the VCG is released. At step 650, the local CPM 500 and the source node 504 are informed of the failure. At step 652, the CPM 500 reports the failed path setup to the NG-OSS 140. The failure report may include a cause code or other indication of a reason for failure of the path setup. For example, the report may indicate that the VCAT operation failed for a specific identified reason.

On the other hand, if it is determined at step 646 that the VCAT operation was successful, processing moves to step 636, at which step the CPM 500 reports to the NG-OSS 140 that the path was setup successfully. Similar methods to that shown in FIG. 6B can provide for processing other types of service requests, e.g., modification of an active connection.

Figure 6C:
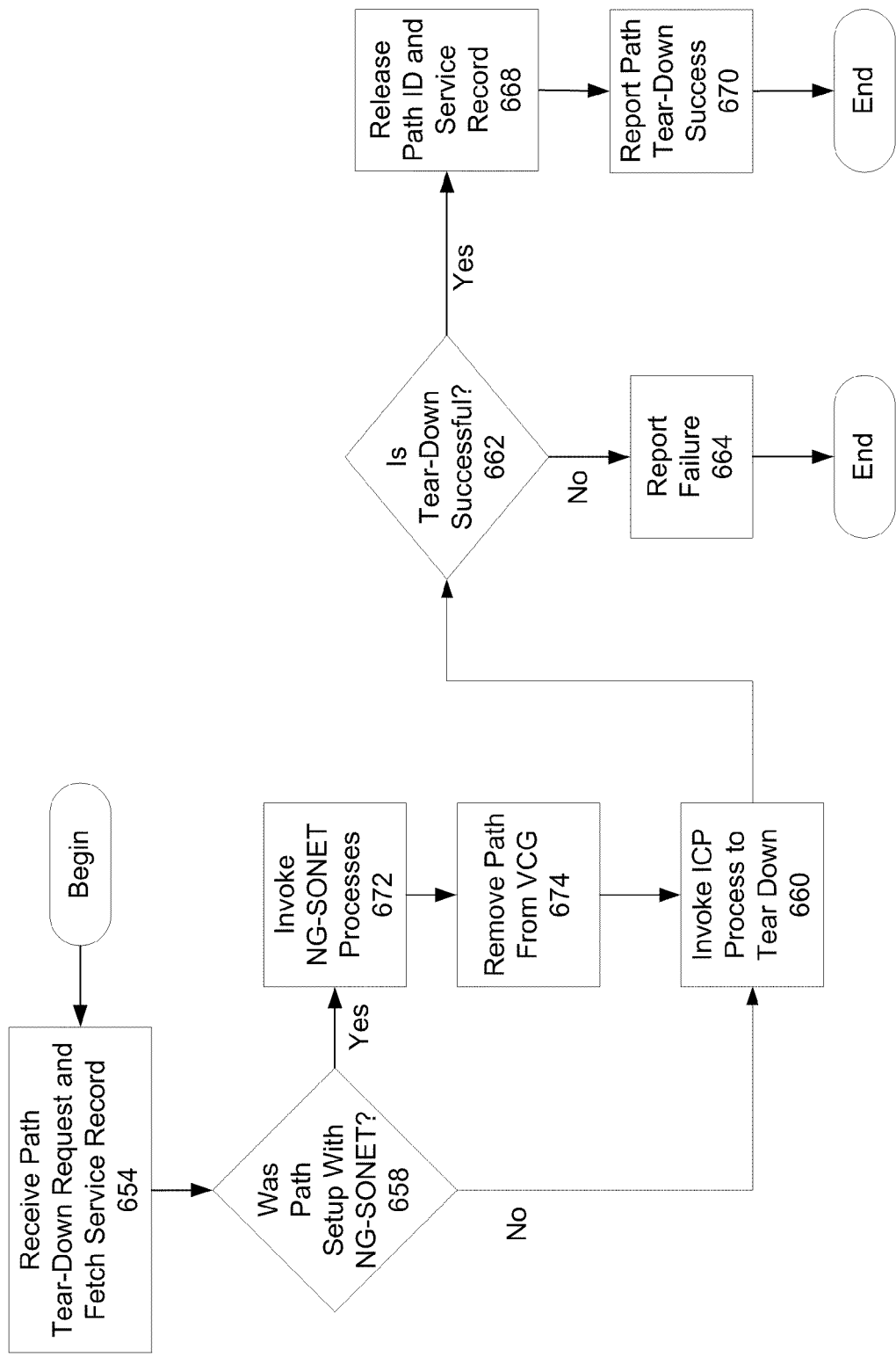
FIG. 6C is a flowchart illustrating an example of a method of path tear-down at a source node of the next-generation optical transport network (NG-OTN) of FIG. 5, according to an exemplary embodiment.

FIG. 6C is a flowchart illustrating an example of a method of path tear-down at a source node 504 of the NG-OTN 110 of FIG. 5. At step 654, the CPM 500 at the source node 504 receives a command from the NG-OSS 140 indicating a path tear-down request. The path command should include the path identifier. The CPM 500 uses the path identifier to fetch the service record, which contains information associated with the path, including parameters specifying origin and destination points, bandwidth requirements, service class, path and/or service identifiers, action identifier, and whether NG-SONET functions provisioned for the path command. Any other information helpful for provisioning the path may also be included with the path command.

At step 658, the CPM 500 determines whether the identified path was setup with NG-SONET processes 520. In one embodiment, this determination is made by checking parameter(s) obtained from the service record.

If it is determined at step 658 that the path is not an NG-SONET path, processing continues at step 660. At step 660, the CPM 500 invokes the ICP processes 510 to initiate path tear-down via ICP 130 signaling. Processing then moves to step 662, at which step the CPM 500 coordinates with the ICP processes 510 to determine whether path tear-down was successful. If it is determined that path tear-down was unsuccessful, processing continues at step 664, at which step the CPM 500 reports the failed path tear-down to the NG-OSS 140. The failure report may include a cause code or other indication of a reason for failure.

On the other hand, if it is determined at step 662 that the tear-down was successful, processing moves to step 668. At step 668, the path identifier and the service record are released. Processing then moves to step 670, at which step, the CPM 500 reports to the NG-OSS 140 that the path was torn down successfully.

Back at step 658, if it is determined at step 658 that the path is an NG-SONET path, processing continues at step 672, at which step the CPM 500 invokes the NG-SONET processes 520 to perform VCAT and/or LCAS signaling with the destination node over the path. At step 674, the path is removed from its virtual concatenation group (VCG). Processing then moves to step 660, which is performed as discussed above. Processing continues on through the steps 662 and 664 or steps 662, 668, and 670 as described above. Similar methods to that shown in FIG. 8C can provide for processing other types of service requests, e.g., bandwidth modifications.

Figure 6D:
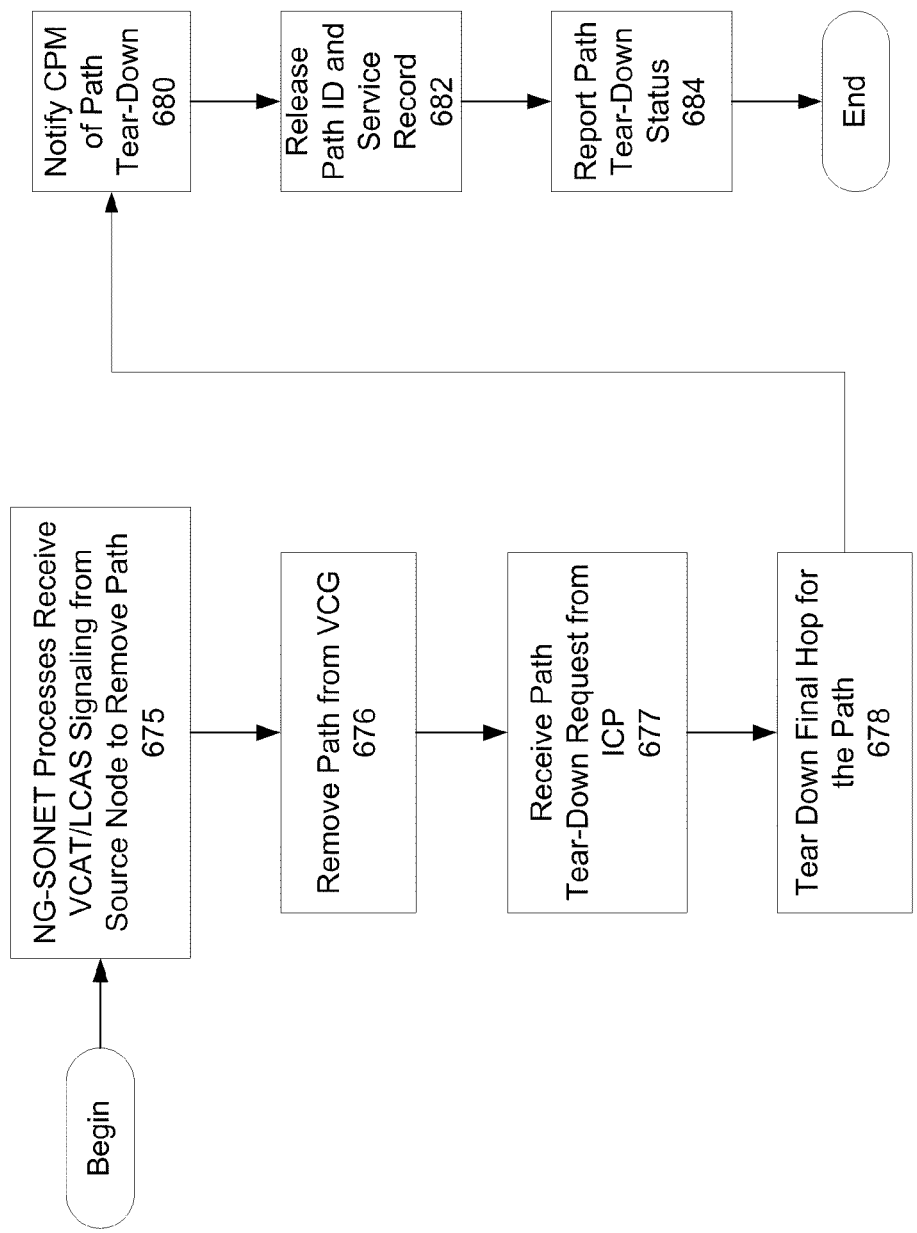
FIG. 6D is a flowchart illustrating an example of a method of path tear-down at an end node of the next-generation optical transport network (NG-OTN) of FIG. 5, according to an exemplary embodiment.

FIG. 6D is a flowchart illustrating an example of a method of path tear-down at a destination node 508 of the NG-OTN 110 of FIG. 5. At step 675, the NG_SONET processes 520 receive VCAT/LCAS signaling from the source node 504 to remove the identified path. At step 676, the path is removed from its VCG. At step 677, the ICP processes 510 at the end node receive a command from the ICP 130 indicating a path tear-down command. At step 678, the ICP processes 510 tear down a final link for the identified path. At step 680, the ICP processes 510 notify the CPM 500 at the destination node 508 of the path tear-down. At step 682, the path identifier and the service record are released. Processing then continues at step 684, at which step the destination node 508 reports the status of the path tear-down to the NG-OSS 140.

III. On-Demand Bandwidth Provisioning Model

With the above-discussed infrastructures and methods in place, the system 100 provides a model for the development, implementation, provisioning, and management of bandwidth-on-demand (BOD) services over next-generation optical networks. BOD services preferably provide users with flexibility, cost-savings, and efficiency in the provisioning and management of telecommunications services. BOD services can provide self-running (e.g., self-activation, self-configuration, self-adapting, self-healing, etc.) services that are customizable and controllable by clients 120, as well as services that are integrated and operated across multiple domains and carriers.

BOD services can further provide multiple provisioning-related features, including but not limited to: on-demand provisioning of a wide range of bandwidths, including wavelength; multiple modes of call initiations; and real-time on-demand bandwidth modifications on any active connection without any service disruption.

IV. Bandwidth-On-Demand Services

Examples of bandwidth-on-demand (BOD) services and methods for managing (e.g., provisioning) the BOD services are described below. However, the system 100 is in no way limited to supporting the illustrated services and can support a wide range of other BOD-type services based on the on-demand bandwidth provisioning model. Further, in the examples described below, the client devices 120 are described as the sources of service requests. However, this is merely by way of example, and it will be understood that the service requests may originate from other sources.

As discussed above, different service logics 144 can be configured and implemented in the system 100 to provide different BOD services. Accordingly, the below description of exemplary BOD services includes a description of an example of a process flow for identifying appropriate service logics 144 based on parameters in service requests. Further, the flow of service logics 144 for certain service requests within the exemplary BOD services are described below.

Figure 7:
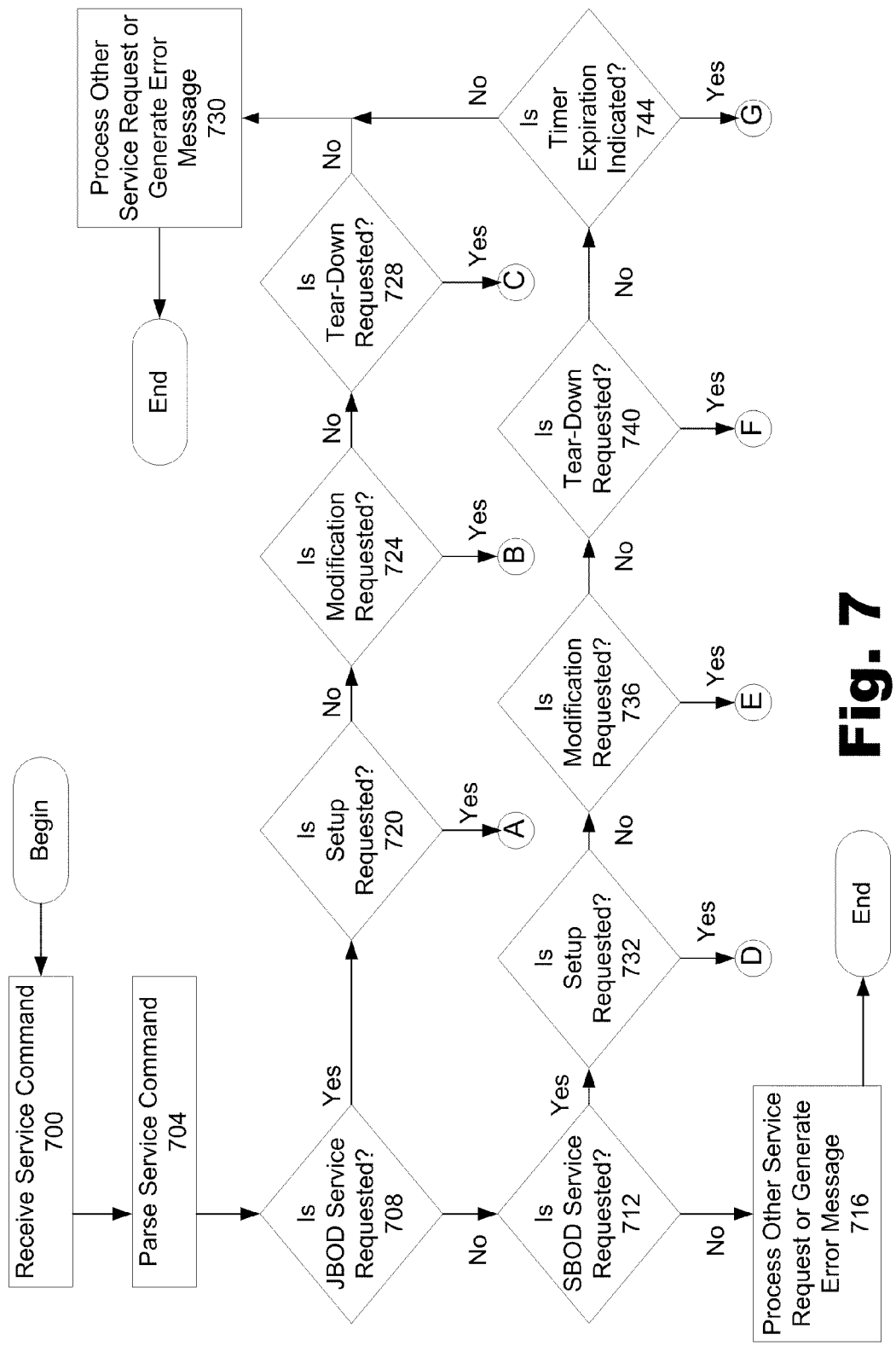
FIG. 7 is a flowchart illustrating an example of a method of identifying service logics for certain bandwidth-on-demand services, according to an exemplary embodiment.

FIG. 7 is a flowchart illustrating an example of a method of identifying specific service logics 144 for just-in-time bandwidth-on-demand (JBOD) and scheduled bandwidth-on-demand (SBOD) services. Provisioning and management functions associated with these two service classes will be described in more detail with reference to FIGS. 8A-8C and 9A-9D.

At step 700 of FIG. 7, the NG-OSS 140 receives a service command. The service command can include requests from client devices 120 (via the SMS 134) as discussed above or a timer notification generated by the system 100, which will be described below. The service command can include any of the parameters discussed above, including parameters identifying the service class requested (e.g., JBOD, SBOD, or other service), the type of action requested (e.g., setup, modify, or tear-down path commands), the source site and port identifications, the destination site and port identifications, bandwidth settings or adjustments, bandwidth schedules, session and path identifications, protection settings, restoration settings, period identification, etc.

At step 704, the NG-OSS 140 parses the service command. In particular, the NG-OSS 140 extracts parameters from the service command. The parameters can be inserted into another format for further processing.

At step 708, it is determined whether JBOD service is requested. This can be determined from a service class parameter setting. If it is determined at step 708 that JBOD service is not requested, processing moves to step 712. At step 712, it is determined whether SBOD service is requested. This can be determined from a service class parameter setting. If it is determined at step 712 that SBOD service is not requested, processing moves to step 716. At step 716, a service command specifying another service class can be processed. This may include processing services that are known to those skilled in the art. If a recognizable service class is not specified by the service command, then an error message is generated at step 716. The error message may be made available to the client device 120.

On the other hand, if it is determined at step 708 that JBOD service is requested, processing moves to step 720. At step 720, it is determined whether a setup path action is requested. This determination can be based on a parameter of the service command specifying a requested service action. If it is determined at step 720 that a setup path action is requested, processing continues at A, which will be discussed below in relation to FIG. 8A. On the other hand, if it is determined at step 720 that a setup path action is not requested, processing continues at step 724.

At step 724, it is determined whether a service modification action is requested. This determination can be based on a parameter of the service command specifying a requested service action. If it is determined at step 724 that a service modification action is requested, processing continues at B, which will be discussed below in relation to FIG. 8B. On the other hand, if it is determined at step 724 that a service modification action is not requested, processing continues at step 728.

At step 728, it is determined whether a path tear-down action is requested. This determination can be based on a parameter of the service command specifying a requested service action. If it is determined at step 728 that a path tear-down action is requested, processing continues at C, which will be discussed below in relation to FIG. 8C. On the other hand, if it is determined at step 728 that a path tear-down action is not requested, processing continues at step 730.

At step 730, a service command specifying another service action can be processed if another action recognizable and executable by the service logics 144 is specified in the service command. If a recognizable service action is not specified by the service command, then an error message is generated at step 730. The error message may be made available to the client device 120.

Returning to step 712, if is determined at this step that SBOD service is requested, processing moves to step 732. At step 732, it is determined whether a setup schedule action is requested. This determination can be based on a parameter of the service command specifying a requested service action. If it is determined at step 732 that a setup schedule action is requested, processing continues at D, which will be discussed below in relation to FIG. 9A. On the other hand, if it is determined at step 732 that a setup schedule action is not requested, processing continues at step 736.

At step 736, it is determined whether a schedule modification action is requested. This determination can be based on a parameter of the service command specifying a requested service action. If it is determined at step 736 that a service modification action is requested, processing continues at E, which will be discussed below in relation to FIG. 9B. On the other hand, if it is determined at step 736 that a schedule modification action is not requested, processing continues at step 740.

At step 740, it is determined whether a tear-down action is requested. This determination can be based on a parameter of the service command specifying a requested service action. If it is determined at step 740 that a tear-down action is requested, processing continues at F, which will be discussed below in relation to FIG. 9C. On the other hand, if it is determined at step 740 that a path tear-down action is not requested, processing continues at step 744.

At step 744, it is determined whether a scheduled timer expiration is indicated. This determination can be based on a parameter of the service command specifying a requested service action. The period transition can be indicated by a service command generated in response to a timer expiration notification. If it is determined at step 744 that a scheduled period transition is requested, processing continues at G, which will be discussed below in relation to FIG. 9D. On the other hand, if it is determined at step 744 that a scheduled period transition is not requested, processing continues at step 730, which is discussed above.

Once the service class and service action have been identified from a service command, appropriate service logics 144 are identified and executed to generate command sequences that are executable by the NG-OTN 110 to perform requested service actions. JBOD and SBOD service classes, as well as process flows of service logics 144 for certain examples of JBOD and SBOD service actions will now be discussed in more detail.

A. Just-in-Time Bandwidth-on-Demand (JBOD)

Just-in-time bandwidth-on-demand (JBOD) (also referred to as on-demand provisioning) services enable client devices 120 to request (e.g., by dial-up) transport services (e.g., broadband and wideband) of desired bandwidth, whenever and wherever it is desired. In some embodiments, the system 100 can provision and activate the requested JBOD service within seconds or minutes of receiving the request. The technologies of the NG-OSS 140 and the NG-OTN 110 work together to provide quick reaction times for provisioning and managing JBOD services according to user requests. The JBOD services can include other service and provisioning features disclosed above (e.g., providing a range of bandwidths).

Figure 8A:
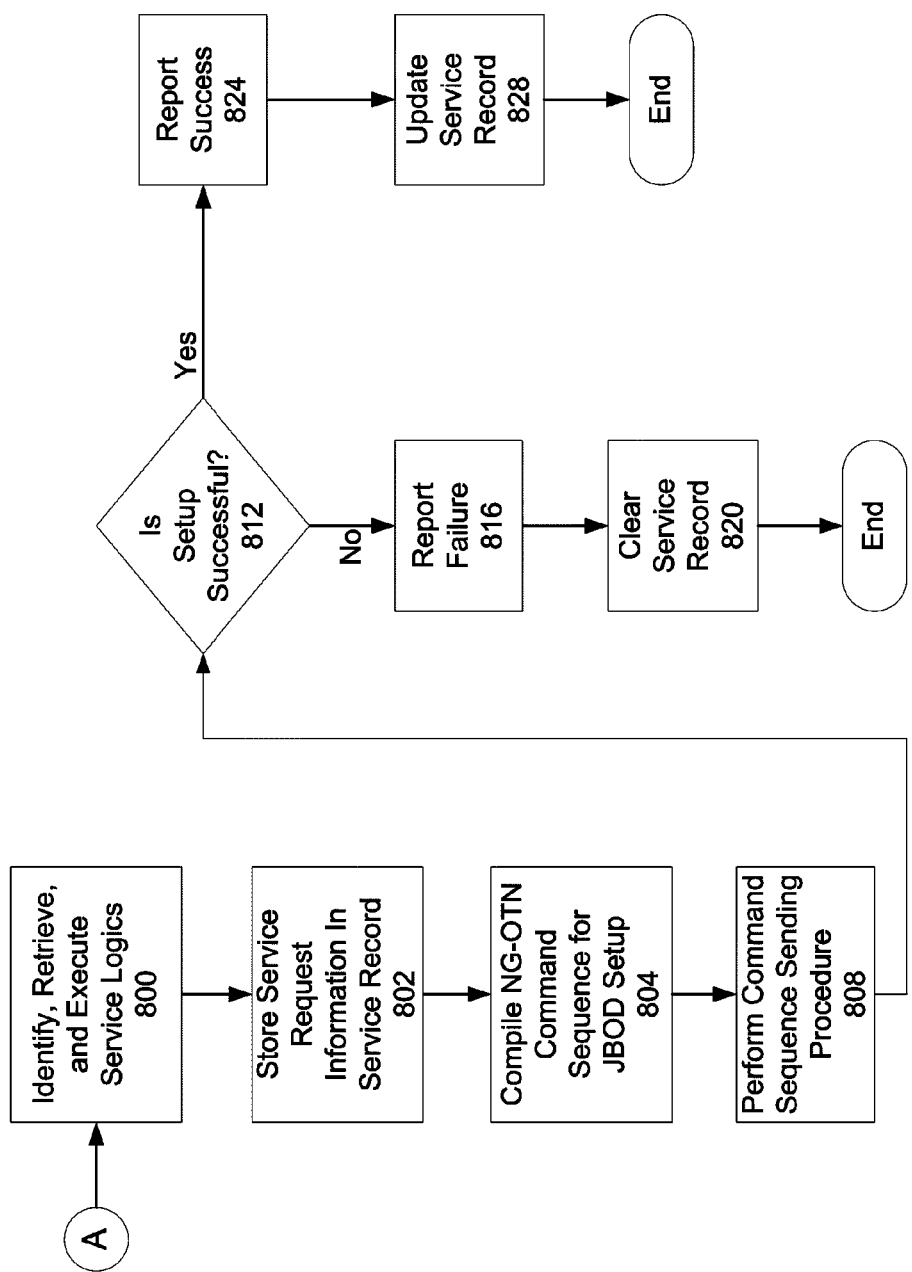
FIG. 8A is a flowchart showing one example of a flow of service logics for a setup request for just-in-time bandwidth-on-demand (JBOD) service, according to an exemplary embodiment.
Figure 8B:
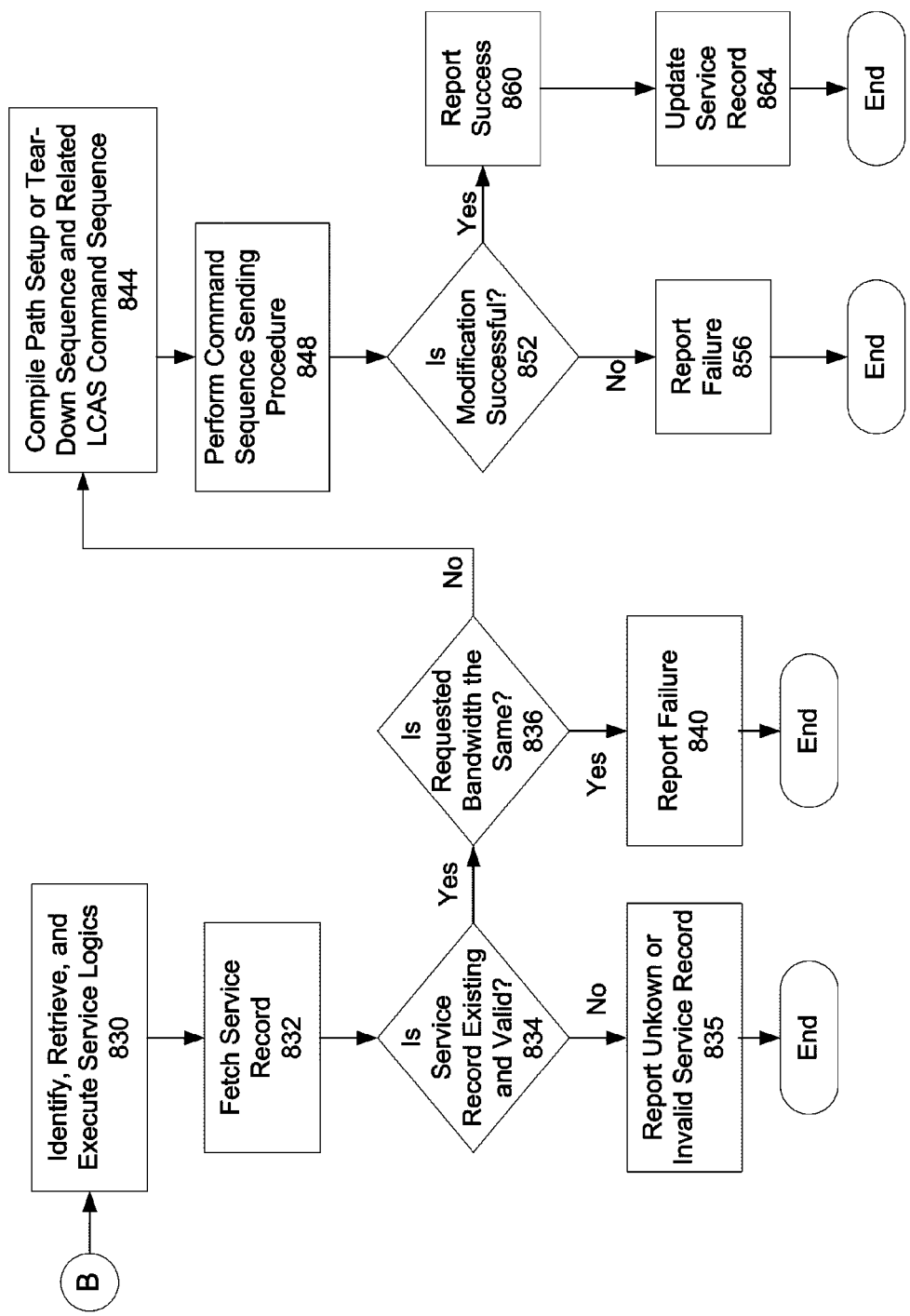
FIG. 8B is a flowchart showing one example of a flow of service logics for a modification request for a just-in-time bandwidth-on-demand (JBOD) service, according to an exemplary embodiment.
Figure 8C:
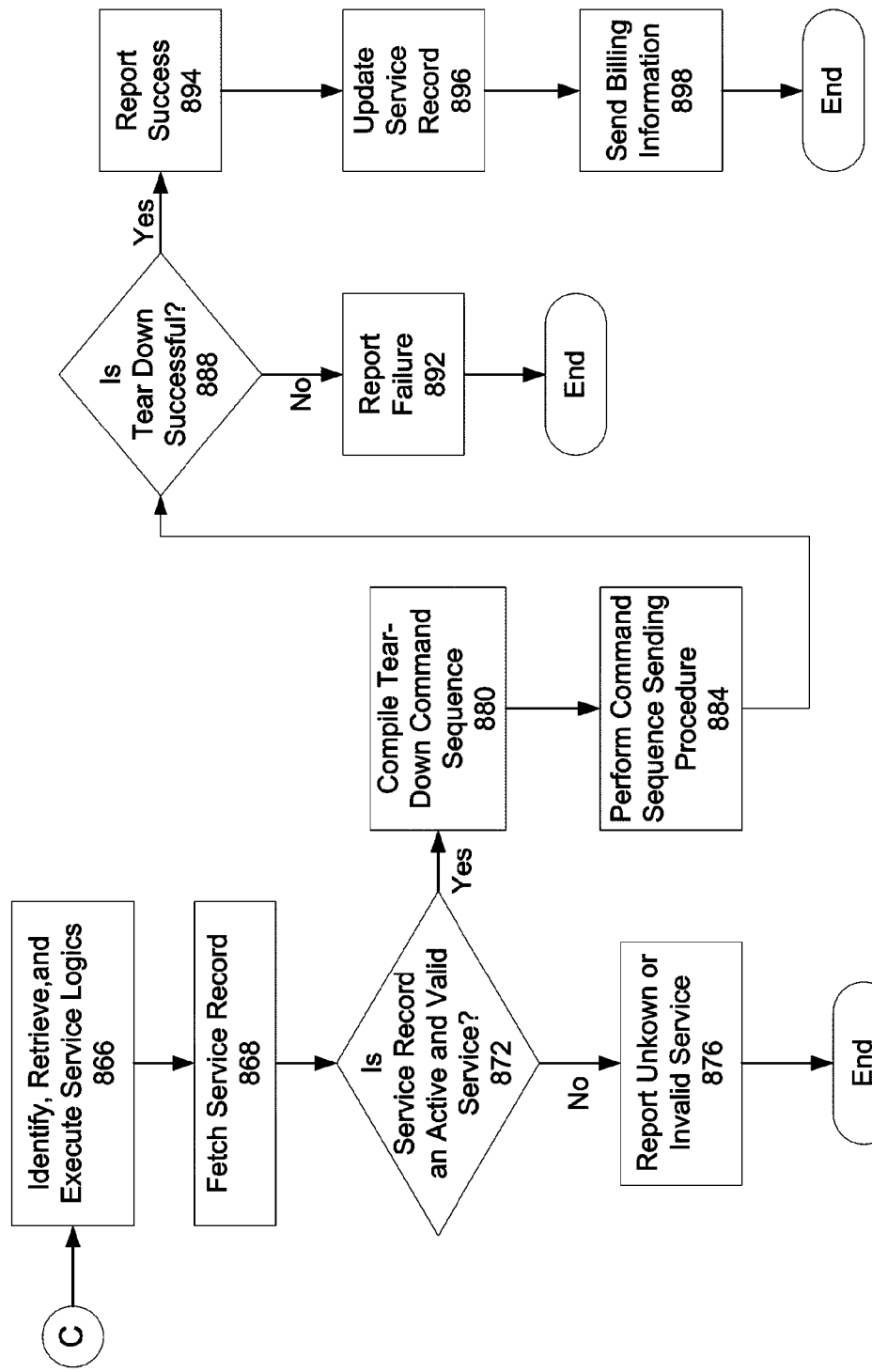
FIG. 8C is a flowchart showing one example of a flow of service logics for a tear-down request for a just-in-time bandwidth-on-demand (JBOD) service, according to an exemplary embodiment.

FIGS. 8A-8C are flowcharts showing examples of the flow of the service logics 144 defining JBOD services for three different JBOD service requests—a setup request, a modification request, and a tear-down request. Prior to the beginning of the processes shown in FIGS. 8A-8C, the NG-OSS 140 initiates communications with network elements 122 of the NG-OTN 110. In some embodiments, these communications comprise Transaction Language 1 (TL1) communications. Once communications have been initiated with the NG-OTN 110, the NG-OSS 140 waits for notifications, including notifications of service requests from the SMS 134 and/or notifications of service commands (e.g., a timer notification or alarm) from the NG-OTN 110.

1. JBOD Setup Process Flow

When it is determined in the process of FIG. 7 that a service command indicates a JBOD path-setup request, the process shown in FIG. 8A begins at point A. At step 800, the NG-OSS 140 identifies, retrieves, and executes the appropriate service logics 144 for a JBOD path-setup command. Steps 802-828 describe the execution of the retrieved service logics 144. At step 802, NG-OSS 140 stores information associated with the service command, including request parameters, in a local service record (also referred to as a "local call record").

At step 804, the service logics engine 400 compiles a sequence of commands for JBOD setup to be sent to an originating network element 122 of the NG-OTN 110 for execution. Step 804 includes executing the retrieved service logics 144 with the parameters in the local service record to generate a sequence of commands that can be executed by the NG-OTN 110. In one embodiment, execution of the retrieved service logics 144 generates TL1 commands that when executed by the elements of the NG-OTN 110 (e.g., the CPM 500, network elements 122, NG-SONET 132, and ICP 130) will cause the NG-OTN 110 to setup a JBOD path according to the features of JBOD services described above. Appropriate TL1 commands for setting up an active connection on Lucent platforms can be referenced at "LambdaUnite MSS— Operations System Engineering Guide", provided by Lucent Technologies of Murray Hill, N.J., which has been incorporated by reference in its entirety.

At step 808, the NG-OSS 140 performs a command sequence sending procedure for sending the Command sequence to the NG-OTN 110. In one embodiment, the command sequence is a sequence of Transaction Language 1 (TL1) commands and the command procedure is a TL1 command sequence procedure that is performed as follows. The procedure sends the first TL1 command from the sequence and then polls for a result code with a timed wait of some predetermined period. If the NG-OSS 140 receives, a negative acknowledgement from the NG-OTN 110 or times out, the procedure causes restoration TL1 commands to be issued to restore the network element 122 of the NG-OTN 110 to its initial condition. A failure code is generated. On the other hand, if a positive acknowledgment is received and no time-out occurs, the command sequence procedure repeats if the end of the command sequence has not yet been reached. Once the end of the sequence of commands is reached, processing continues at step 812.

At step 812, it is determined whether the setup was successful. This can be determined from output generated by the command sequence procedure. If it is determined at step 812 that setup was not successful, processing continues and step 816, at which step the NG-OSS 140 reports the failure and failure code to the client device 120. At step 820, the service record is cleared. The NG-OSS 140 then waits for another service request.

On the other hand, if it is determined at step 812 that setup was successful, the success is reported to the client device 120 along with a new path identification at step 824. At step 828, the service record and related databases are updated to reflect the successful setup. The NG-OSS 140 then waits for another service request.

2. JBOD Modification Process Flow

When it is determined in the process of FIG. 7 that a service command indicates a JBOD modification request, the process shown in FIG. 8B begins at point B. At step 830, the NG-OSS 140 identifies, retrieves, and executes the appropriate service logics 144 for a JBOD modification command. Steps 832-864 describe the execution of the retrieved service logics 144. At step 832, the NG-OSS 140 fetches the particular service record identified by the service command. At step 834, it is determined if the fetched service record is active and valid. If it is determined at step 834 that the service record is not active and valid, processing moves to step 835. At step 835, the unknown or invalid service record is reported.

On the other hand, if is determined at step 834 that the fetched service record is valid and active, process continues at step 836. At step 836, the NG-OSS 140 determines whether the requested bandwidth modification setting is the same as the current bandwidth setting of the identified service request. This determination can be made by comparing the current bandwidth setting identified by the service record with the parameter of the service commands specifying the new bandwidth request. If it is determined at step 836 that the bandwidth settings are the same, processing continues at step 840, at which step a modification failure is reported. The NG-OSS 140 can make the modification failure available to the client device 120. The NG-OSS 140 then waits for another service request.

On the other hand, if it is determined at step 836 that the bandwidth settings are not the same, processing continues at step 844. At step 844, the service logics engine 400 compiles a command sequence to execute link capacity adjustments schemes (LCAS) for the requested bandwidth using NG-SONET technologies in the NG-OTN 110. In one embodiment, the service logics engine 400 is configured to generate a TL1 command sequence based on the retrieved service logics 144 and the parameters specified in the service command. Settings identified in the service record can also be used to compile the TL1 command sequence. Appropriate TL1 commands for modifying an active connection on Lucent platforms can be referenced at "LambdaUnite MSS— Operations System Engineering Guide", provided by Lucent Technologies of Murray Hill, N.J., which has been incorporated by reference in its entirety. At step 848, the NG-OSS 140 performs a command sequence procedure for sending the command sequence to the NG-OTN 110. The command sequence procedure may be the same command procedure described above in relation to FIG. 8A.

At step 852, it is determined whether the modification was successful. This can be determined from output generated by the command sequence procedure or by other messages received from the NG-OTN 110. If it is determined at step 852 that modification was not successful, processing continues at step 856, at which step the NG-OSS 140 reports the failure and failure code to the client device 120. The NG-OSS 140 then waits for another service request.

On the other hand, if it is determined at step 852 that modification was successful, the success is reported to the client device 120. Success can be determined from messages received from the NG-OTN 110. At step 864, the service record and related databases are updated to reflect the successful modification. The NG-OSS 140 then waits for another service request.

3. JBOD Tear-Down Process Flow

When it is determined in the process of FIG. 7 that a service command indicates a JBOD tear-down request, the process shown in FIG. 8C begins at point C. At step 866, the NG-OSS 140 identifies, retrieves, and executes the appropriate service logics 144 for a JBOD tear-down command. Steps 868-898 describe the execution of the retrieved service logics 144. At step 868, the NG-OSS 140 fetches the particular service record identified by parameters of the service command. At step 872, the NG-OSS 140 determines whether the identified service record indicates an active and valid service (e.g., an active call). If it is determined at step 872 that the service record is not an active service, processing continues at step 876, at which step an "unknown service" or "invalid service" error is reported to the client device 120. The NG-OSS 140 then waits for another service request.

On the other hand, if it is determined at step 872 that the service record is an active service, processing continues at step 880. At step 880, the service logics engine 400 compiles a tear-down command sequence to be executed by the NG-OTN 110 to tear down the service. In one embodiment, the service logics engine 400 is configured to generate a TL1 command sequence based on the retrieved service logics 144 and the parameters specified in the service command. Settings identified in the service record can also be used to compile the TL1 command sequence. Appropriate TL1 commands for tearing down an active connection on Lucent platforms can be referenced at "LambdaUnite MSS—Operations System Engineering Guide", provided by Lucent Technologies of Murray Hill, N.J., which has been incorporated by reference in its entirety. At step 884, the NG-OSS 140 performs a command sequence procedure for sending the command sequence to the NG-OTN 110. The command sequence procedure may be the same command procedure described above in relation to FIG. 8A.

At step 888, it is determined whether the tear down was successful. This can be determined from output generated by the command sequence procedure and/or by messages received from the NG-OTN 110. If it is determined at step 888 that tear down was not successful, processing continues and step 892, at which step the NG-OSS 140 reports the failure and failure code to the client device 120. The NG-OSS 140 may also generate a trouble ticket to trace the problem. The NG-OSS 140 then waits for another service request.

On the other hand, if it is determined at step 888 that tear down was successful, the success is reported to the client device 120 at step 894. At step 896, the service record and related databases are updated to reflect the successful tear down. At step 898, billing information may be sent to accounting. The NG-OSS 140 then waits for another service request.

While examples have been discussed for setup, modification, and tear-down commands, the service logics 144 defining JBOD services can be configured to process many other JBOD service related commands or requests. Further, those skilled in the art will recognize that JBOD command sequences to be executed by the NG-OTN 110 can utilize protocols other than TL1. For example, the NG-OSS 140 may be configured with service logics 144 designed to generate CORBA (e.g., using a TMF-814 based information model), XML, and SNMP protocols.

B. Scheduled Bandwidth On-Demand (SBoD)

Scheduled bandwidth-on-demand (SBOD) services enable users to submit bandwidth schedules along with service requests to take advantage of predictable or repetitive patterns of bandwidth usage. SBOD services provide users with the ability to schedule bandwidth and other provisioning services in advance. Using SBOD services, the service provider is able to provide users with bandwidth according to the submitted schedules. In one embodiment, all scheduled bandwidth changes are generally completed within a few minutes of the scheduled time. SBOD services provide users, especially enterprise users, with the ability to tailor service bandwidths to actual usage patterns, thereby providing users with control of their operation efficiency and communications costs. Users can decrease costs of communications services, especially during non-peak periods. SBOD services can further include other service and provisioning features disclosed above.

FIGS. 9A-9D are flowcharts showing examples of the flow of the service logics 144 defining SBOD services for four different SBOD service requests—a schedule setup request, a modification request, a tear-down request, and a timer notification. Prior to the beginning of the processes shown in FIGS. 9A-9D, the NG-OSS 140 initiates communications with network elements 122 of the NG-OTN 110. In some embodiments, these communications comprise Transaction Language (TL1) communications. Once communications have been initiated with the NG-OTN 110, the NG-OSS 140 launches a timer thread for keeping time to recognize beginning and end times of bandwidth periods. The NG-OSS 140 then waits for notifications, including notifications of service requests from the SMS 134, timer notifications, and/or notifications of service commands (e.g., a timer notification or alarm) from the NG-OTN 110.

SBOD service logics 144 may be configured to monitor for alarm notifications related to the communications lines to the NG-OTN 110. For example, service logics 144 defining SBOD can check for TL1 alarm notifications. If a TL1 alarm is received, the NG-OSS 140 acknowledges and logs the alarm. The system 100 can also notify network or system operators of the alarm.

1. SBOD Setup Process Flow

Figure 9A:
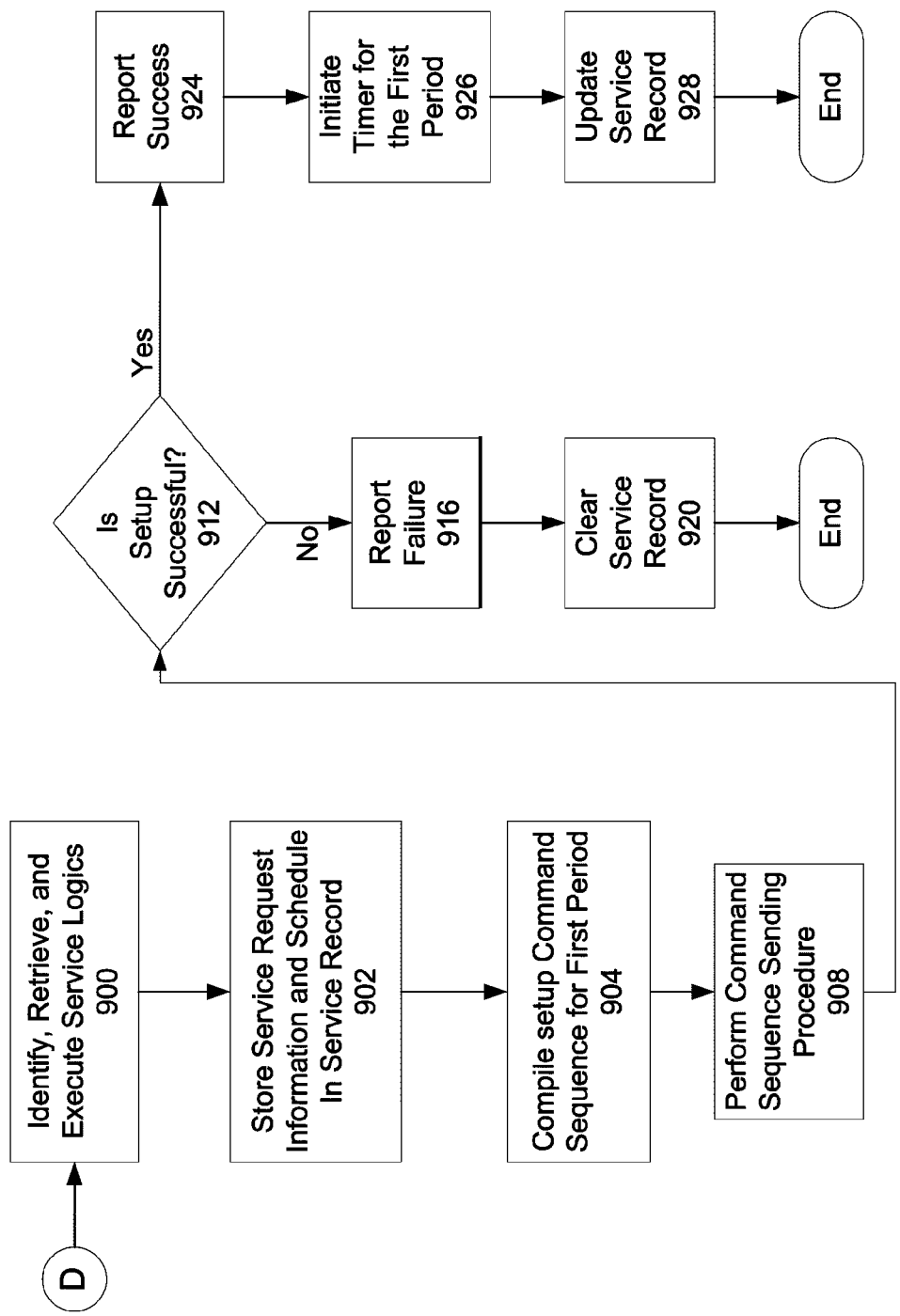
FIG. 9A is a flowchart showing one example of a flow of service logics for a setup request for a scheduled bandwidth-on-demand (SBOD) service, according to an exemplary embodiment.

When it is determined in the process of FIG. 7 that a service command indicates a SBOD schedule-setup request, the process shown in FIG. 9A begins at point D. At step 900, the NG-OSS 140 identifies, retrieves, and executes the appropriate service logics 144 for a SBOD schedule-setup command. Steps 902-928 describe the execution of the retrieved service logics 144. At 902, NG-OSS 140 stores information associated with the service command, including bandwidth schedules and other command parameters, in a local service record (also referred to as a "local call record"). At 904, the service logics engine 400 compiles a sequence of commands for the first period identified in a bandwidth schedule to be sent to an originating network element 122 of the NG-OTN 110 for execution. The sequence of commands can include port identification, classes of service (CoS), and/or quality of service (QoS) parameters to be sent to the proper network elements 122 for the first period of time specified in the submitted schedule. In one embodiment, the service logics engine 400 is configured to generate a TL1 command sequence based on the retrieved service logics 144 and the parameters specified in the service command. Settings identified in the service record can also be used to compile the TL1 command sequence. Appropriate TL1 commands for setting up a service path on Lucent platforms according to the schedule can be referenced at "LambdaUnite MSS—Operations System Engineering Guide", provided by Lucent Technologies of Murray Hill, N.J., which has been incorporated by reference in its entirety.

At step 908, the NG-OSS 140 performs a command sequence procedure for sending the command sequence to the NG-OTN 110. The command sequence procedure may be the same command procedure described above in relation to FIG. 8A.

At step 912, it is determined whether the setup was successful. This can be determined from output generated by the command sequence procedure and/or from messages received from the NG-OTN 110, which messages the NG-OSS 140 is configured to interpret. If it is determined at step 912 that setup was not successful, processing continues at step 916, at which step the NG-OSS 140 reports the failure and failure code to the client device 120. At step 920, the service record is cleared. The NG-OSS 140 then waits for another notification.

On the other hand, if it is determined at step 912 that setup was successful, the success is reported to the client device 120. A new path identification is also reported at step 924 if a path is established for the first service period specified in the service schedule. At step 926, a timer for the first period of the scheduled service is initiated. At step 928, the service record and related databases are updated to reflect the successful setup. The NG-OSS 140 then waits for another notification.

2. BOD Modification Process Flow

Figure 9B:
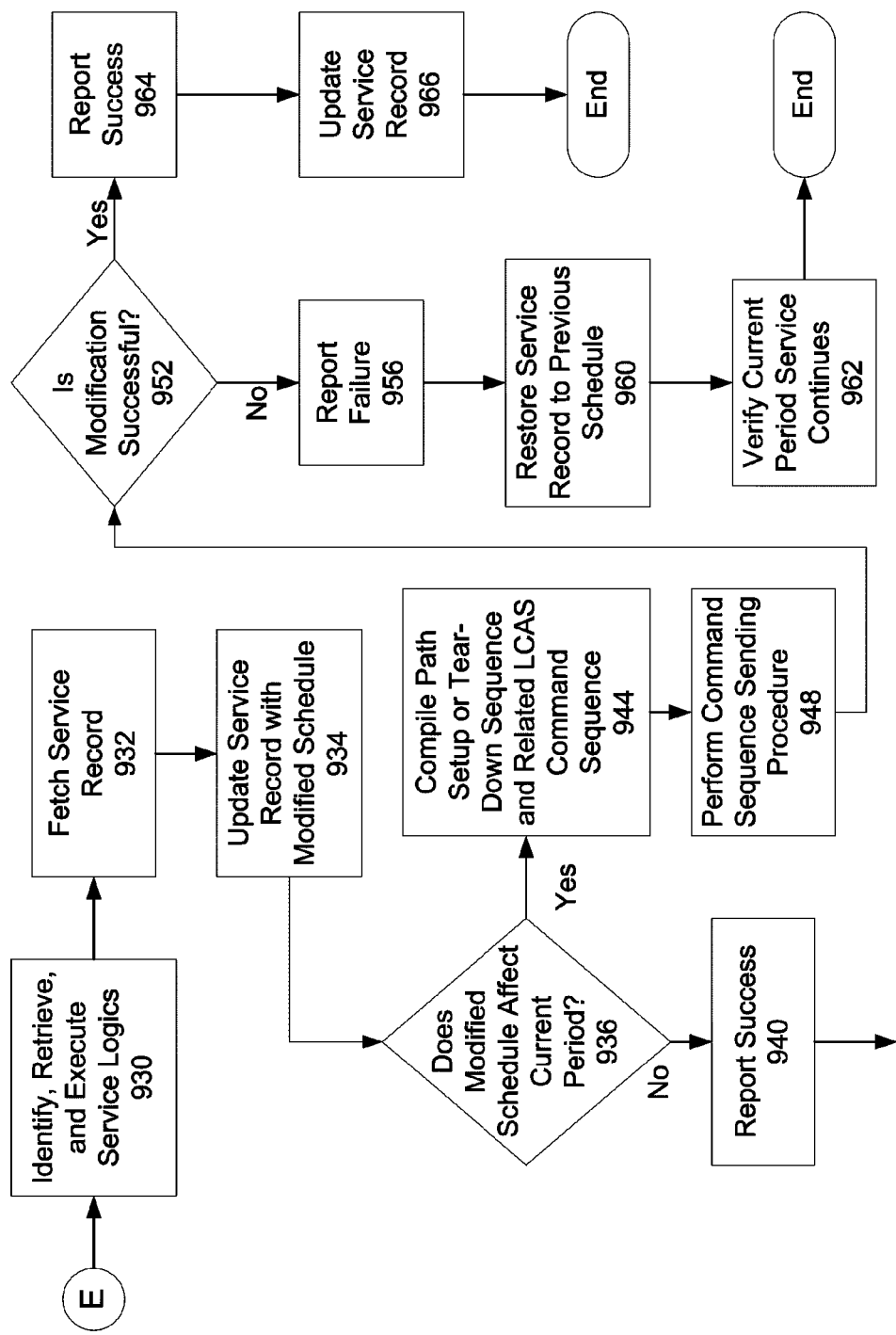
FIG. 9B is a flowchart showing one example of a flow of service logics for a modification request for a scheduled bandwidth-on-demand (SBOD) service, according to an exemplary embodiment.

When it is determined in the process of FIG. 7 that a service command indicates a SBOD schedule modification, the process shown in FIG. 9B begins at point E. At step 930, the NG-OSS 140 identifies, retrieves, and executes the appropriate service logics 144 for a SBOD schedule-setup command. Steps 932-966 describe the execution of the retrieved service logics 144. At step 932, the NG-OSS 140 fetches the particular service record identified by the modification command. At step 934, the identified service record is updated with a modified or new schedule according to parameters provided with the modification command. At step 936, the NG-OSS 140 determines whether the modified schedule will affect the current time period. If it is determined at step 936 that service provided during the current time period will not be affected by the new schedule, processing continues at step 940, at which step a modification success is reported along with a path identification. The NG-OSS 140 then waits for another service request.

On the other hand, if it is determined at step 936 that modified schedule will affect service provided during the current time period, processing continues at step 944. At step 944, the service logics engine 400 compiles a command sequence to execute link capacity adjustments schemes (LCAS) for the remainder of the current period using NG-SONET technologies in the NG-OTN 110. In one embodiment, the service logics engine 400 is configured to generate a TL1 command sequence based on the retrieved service logics 144 and the parameters specified in the service command. Settings identified in the service record can also be used to compile the TL1 command sequence. Appropriate TL1 commands for modifying a service path (e.g., bandwidth of a path) on Lucent platforms according a service schedule can be referenced at "LambdaUnite MSS—Operations System Engineering Guide", provided by Lucent Technologies of Murray Hill, N.J., which has been incorporated by reference in its entirety.

At step 948, the NG-OSS 140 performs a command sequence procedure for sending the command sequence to the NG-OTN 110. The command sequence procedure may be the same command procedure described above in relation to FIG. 8A.

At step 952, it is determined whether the modification was successful. This can be determined from output generated by the command sequence procedure and/or from messages received from the NG-OTN 110, which the NG-OSS 140 is configured to interpret. If it is determined at step 952 that modification was not successful, processing continues at step 956, at which step the NG-OSS 140 reports the failure and failure code to the client device 120. At step 960, the service record is restored to the previous schedule. At step 962, the NG-OSS 140 verifies that service for the current period continues. The NG-OSS 140 then waits for another notification.

On the other hand, if it is determined at step 952 that modification was successful, the success is reported to the client device 120 along with the path identification at step 964. At step 966, the service record and related databases are updated to reflect successful transition to the new period. The NG-OSS 140 then waits for another notification.

SBOD Tear-Down Process Flow

Figure 9C:
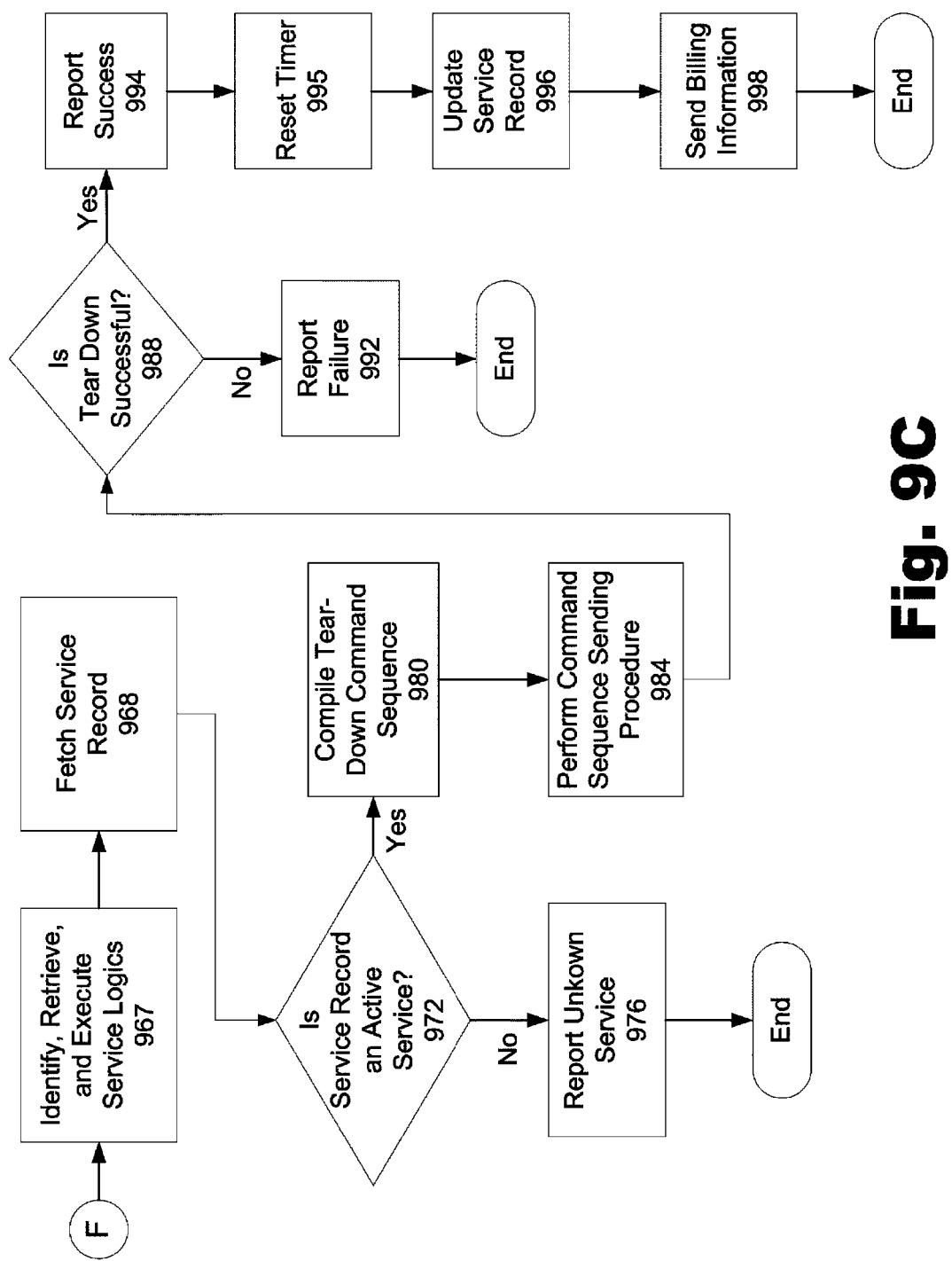
FIG. 9C is a flowchart showing one example of a flow of service logics for a tear-down request for a scheduled bandwidth-on-demand (SBOD) service, according to an exemplary embodiment.

When it is determined in the process of FIG. 7 that a service command indicates a SBOD tear-down action, the process shown in FIG. 9C begins at point F. At step 967, the NG-OSS 140 identifies, retrieves, and executes the appropriate service logics 144 for a SBOD tear-down command. Steps 968-998 describe the execution of the retrieved service logics 144. At step 968, the NG-OSS 140 fetches the particular service record identified by the service request. At step 972, the NG-OSS 140 determines whether the identified service record indicates an active service (e.g., an active call). If it is determined at step 972 that the service record is not an active service, processing continues at step 976, at which step an "unknown service" error is reported to the client device 120. The NG-OSS 140 then waits for another notification.

On the other hand, if it is determined at step 972 that the service record is an active service, processing continues at step 980. At step 980, the service logics engine 400 compiles a tear-down command sequence to execute be executed by the NG-OTN 110 to tear down the VCAT path for the service. In one embodiment, the service logics engine 400 is configured to generate a TL1 command sequence based on the retrieved service logics 144 and the parameters specified in the service command. Settings identified in the service record can also be used to compile the TL1 command sequence. Appropriate TL1 commands for tearing down a service schedule and/or a service path (e.g., bandwidth of a path) on Lucent platforms according a service schedule can be referenced at "LambdaUnite MSS—Operations System Engineering Guide", provided by Lucent Technologies of Murray Hill, N.J., which has been incorporated by reference in its entirety.

At step 984, the NG-OSS 140 performs a command sequence procedure for sending the command sequence to the NG-OTN 110. The command sequence procedure may be the same command procedure described above in relation to FIG. 8A.

At step 988, it is determined whether the tear down was successful. This can be determined from output generated by the command sequence procedure and/or message received from the NG-OTN 110, which can be interpreted by the NG-OSS 140. If it is determined at step 988 that tear down was not successful, processing continues at step 992, at which step the NG-OSS 140 reports the failure and failure code to the client device 120. The NG-OSS 140 may also generate a trouble ticket to trace the problem. The NG-OSS 140 then waits for another service request.

On the other hand, if it is determined at step 988 that tear down was successful, the success is reported to the client device 120 at step 994. At step 995, the timer is reset. At step 996, the service record and related databases are updated to reflect the successful tear down. At step 998, billing information may be sent to accounting. The NG-OSS 140 then waits for another notification.

4. SBOD Timer Notification Process Flow

Figure 9D:
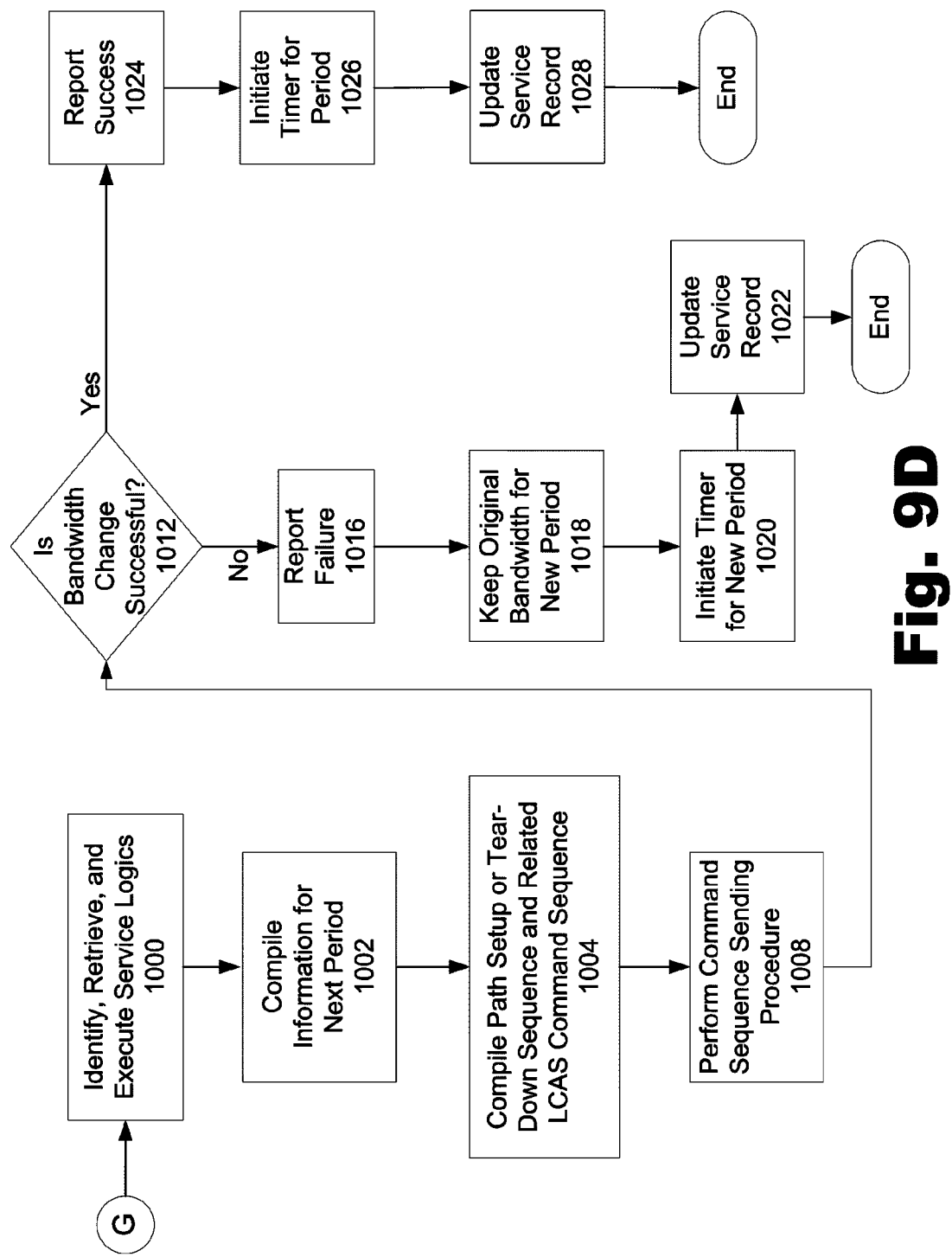
FIG. 9D is a flowchart showing one example of a flow of service logics for a timer expiration notification for a scheduled bandwidth-on-demand (SBOD) service, according to an exemplary embodiment.

When it is determined in the process of FIG. 7 that a service command indicates a SBOD period transition (timer expiration notification) action, the process shown in FIG. 9D begins at point G. At step 1000, the NG-OSS 140 identifies, retrieves, and executes the appropriate service logics 144 for a SBOD period transition command. Steps 1002-1028 describe the execution of the retrieved service logics 144. At step 1002, NG-OSS 140 compiles information associated with the next period and calculates the bandwidth change scheduled for the new period. This information can be accessed from the service record, command parameters, and/or service logics 144. At step 1004, the service logics engine 400 compiles a sequence of LCAS commands to be sent to an originating network element 122 of the NG-OTN 110 for execution. The sequence of commands can include port identification, classes of service (CoS), required bandwidth change, and/or quality of service (QoS) parameters to be sent to the proper network elements 122 for the new period of time specified in the service schedule. In one embodiment, the service logics engine 400 is configured to generate a TL1 command sequence based on the retrieved service logics 144 and the parameters specified in the service command. Settings identified in the service record can also be used to compile the TL1 command sequence. Appropriate TL1 commands for modifying a service on Lucent platforms to transition to a new service schedule period can be referenced at "LambdaUnite MSS—Operations System Engineering Guide", provided by Lucent Technologies of Murray Hill, N.J., which has been incorporated by reference in its entirety.

At step 1008, the NG-OSS 140 performs a command sequence procedure for sending the command sequence to the NG-OTN 110. The command sequence procedure may be the same command procedure described above in relation to FIG. 8A.

At step 1012, it is determined whether the bandwidth change was successful. This can be determined from output generated by the command sequence procedure and/or from messages received from the NG-OTN 110. If it is determined at step 1012 that setup was not successful, processing continues at step 1016, at which step the NG-OSS 140 reports the failure and failure code to the client device 120. At step 1018, the system 100 maintains the current bandwidth for the new period. At step 1020, the timer for the new period is initiated. At step 1022, the service record and related databases are updated to reflect failed transition to the new period. The NG-OSS 140 then waits for another notification.

On the other hand, if it is determined at step 1012 that setup was successful, the success is reported to the client device 120 along with a new period message and number at step 1024. At step 1026, a timer for the new period is initiated. At step 1.028, the service record and related databases are updated to reflect successful transition to the new period. The NG-OSS 140 then waits for another notification.

While examples have been discussed for setup, modification, tear-down, and timer notifications, the service logics 144 defining SBOD services can be configured to process many other SBOD service related commands or requests. Those skilled in the art will recognize that SBOD command sequences to be executed by the NG-OTN 110 can utilize protocols other than TL1. For example, the NG-OSS 140 may be configured with service logics 144 designed to generate CORBA, TMF-814, and SNMP protocols.

The embodiments described above provide bandwidth-on-demand services and functions for managing and provisioning those services. In particular, the system 100 provides infrastructure for implementing and managing bandwidth-on-demand services that provide flexible, cost efficient, and adjustable communications services to users.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system, comprising:
an optical transport network including at least one intelligent control plane capability and at least one synchronous optical network capability and configured to provide at least one bandwidth-on-demand service;
at least one service logic, each service logic configured to define one of at least one procedure for managing said bandwidth-on-demand services;
an operation support subsystem communicatively coupled to said optical transport network; and
a service logics engine associated with said operation support subsystem and having access to said at least one service logic,
said operation support subsystem being configured to:
receive a bandwidth service request,
extract at least one parameter from said bandwidth service request,
identify at least a subset of said at least one service logic associated with said bandwidth service request, and
use said associated service logics engine to insert at least a subset of said at least one parameter extracted from said bandwidth service request into said identified subset of said at least one service logic, and execute said identified subset of said at least one service logic with at least a subset of the extracted parameters to generate, for said operation support subsystem, at least one command configured to be executable by said optical transport network.

2. The system of claim 1, wherein the optical transport network is further configured to receive and execute the at least one command, said execution causing the optical transport network to at least one of perform and implement the requested service responsive to the bandwidth service request.

3. The system of claim 1, wherein said at least one parameter of said bandwidth service request defines whether said bandwidth service request is on-demand or in accordance with a predetermined schedule.

4. The system of claim 1, wherein said at least one procedure for managing said bandwidth-on-demand services includes a procedure configured to provision at least one of said bandwidth-on-demand services, a procedure configured to modify at least one of said bandwidth-on-demand services, and a procedure configured to tear down at least one of said bandwidth-on-demand services.

5. The system of claim 4, wherein said procedure configured to modify at least one of said at least one bandwidth-on-demand services includes a procedure configured to tear down said at least one of said bandwidth-on-demand services and a procedure to provision said at least one of said bandwidth-on-demand services according to said at least one parameter.

6. The system of claim 1, wherein said bandwidth service request includes a request specifying at least one of provisioning, modifying, and tearing down of a bandwidth service.

7. The system of claim 1, wherein said at least one service logic is one of stored within said operation support subsystem and accessible by said operation support subsystem via a network.

8. A system, comprising:
an optical transport network including at least one intelligent control plane capability and at least one synchronous optical network capability and configured to provide at least one bandwidth-on-demand service;
at least one service logic, each service logic configured to define one of at least one procedure for managing said bandwidth-on-demand services;
an operation support subsystem communicatively coupled to said optical transport network, said operation support subsystem being configured to:
receive a bandwidth service request,
extract at least one parameter from said bandwidth service request,
identify a subset of said at least one service logic associated with said bandwidth service request, and
execute said identified subset of at least one of said service logic with at least a subset of the extracted parameters to generate at least one command configured to be executable by said optical transport network; and
a service management subsystem configured to:
receive said bandwidth service request by way of an access interface in response to a request from a client device, and
send said bandwidth service request to said operation support subsystem over an operation support network.

9. The system of claim 8, wherein the service management subsystem is further configured to translate said received bandwidth service request into a form and language usable by said operation support subsystem before sending said bandwidth service request to said operation support subsystem.

10. The system of claim 8, wherein the service management subsystem is further configured to:
receive a status update from the optical transport network by way of the operation support subsystem, the status update being associated with the execution of the at least one command by the optical transport network; and
transmit data representative of the status update to the client device.

11. The system of claim 8, wherein the service management subsystem is further configured to allow a client device to at least one of:
(i) submit changes to service requests after initial submission,
(ii) receive timely order-processing status reports,
(iii) monitor progress of order-processing,
(iv) monitor resource usages and billing-related statistics of an active service,
(v) monitor service performance offered by service providers, and
(vi) receive reports about services in preferred formats.

12. A method, comprising:
receiving a service request at an operation support subsystem;
extracting at least one parameter from the service request;
identifying at least one service logic associated with the service request based on at least one of said extracted parameters;
executing the at least one identified service logic with at least a subset of the extracted parameters by the operation support subsystem to generate at least one command that, when executed by an optical transport network, causes the optical transport network to at least one of perform and implement the requested service responsive to the service request;
transmitting data representative of the at least one command to the optical transport network; and
implementing the service request over the optical transport network by executing the at least one command to invoke at least one intelligent control plane capability and at least one synchronous optical network capability of the optical transport network.

13. The method of claim 12, further comprising receiving the service request in response to a request from a client device.

14. The method of claim 12, wherein the at least one parameter includes a parameter identifying a service class being requested and a parameter identifying a type of action being requested.

15. The method of claim 12, wherein the at least one parameter includes at least one of a parameter identifying a source site, a source port identification, a destination site, a destination port identification, a bandwidth setting, a bandwidth adjustment, a bandwidth schedule, a session identification, a path identification, a protection setting, a restoration setting, and a period identification.

16. The method of claim 12, further comprising generating a Transaction Language 1 command sequence as at least a portion of the at least one command configured for execution by an optical transport network includes.

17. The method of claim 12, further comprising:
receiving a status update from the optical transport network, the status update being associated with the execution of the at least one command by the optical transport network; and
transmitting data representative of the status update to a client device.

18. The method of claim 12, further comprising one of provisioning, modifying, and tearing down an optical path over the optical transport network.

19. A method, comprising:
receiving a service request at a service management subsystem from a client device;
sending the service request to the operation support subsystem over an operation support network;
receiving the service request at the operation support subsystem in response to the request by the client device, the service request including a request for a system action to be performed for the client device;
identifying at least one service logic associated with the service request based on the information contained in the service request;
executing the at least one identified service logic to generate at least one command configured for execution by an optical transport network;
transmitting data representative of the at least one command to the optical transport network; and
executing the at least one command to implement the requested system action over the optical transport network for performing the requested system action for the client device.

20. The method of claim 19, wherein the system action includes at least one of setting up of a bandwidth service, modifying of a bandwidth service, tearing-down of a bandwidth service, provisioning of a service, and performing of a management function.

21. The method of claim 19, further comprising:
receiving a status update from the optical transport network, the status update being associated with the execution of the at least one command by the optical transport network; and transmitting data representative of the status update to the client device.

22. The method of claim 19, further comprising providing functionality at the service management subsystem to allow the client device to at least one of:
  (i) submit changes to service requests after initial submission,
  (ii) receive timely order-processing status reports,
  (iii) monitor progress of order-processing,
  (iv) monitor resource usages and billing-related statistics of an active service,
  (v) monitor service performance offered by service providers, and
  (vi) receive reports about services in preferred formats.

* * * * *